United States Patent
Milluzzi

[11] Patent Number: 5,871,183
[45] Date of Patent: Feb. 16, 1999

[54] GOLF BAG STRAPPING AND STRAPPING SYSTEMS FOR GOLF BAG CARRIERS

[76] Inventor: Robert Milluzzi, 5200 Miller Rd., Brecksville, Ohio 44141

[21] Appl. No.: 294,368

[22] Filed: Aug. 23, 1994

[51] Int. Cl.$^6$ .................................................. A63B 55/00
[52] U.S. Cl. ......................... 248/96; 224/274; 224/901.4
[58] Field of Search .................................... 248/96, 205.2, 248/499, 505; 224/274, 901.4, 534, 568; 280/DIG. 6

[56] References Cited

U.S. PATENT DOCUMENTS

| | | | |
|---|---|---|---|
| D. 344,967 | 3/1994 | Webster | 248/205.2 X |
| 1,321,742 | 11/1919 | Hendricks | 248/505 X |
| 2,040,339 | 5/1936 | Ross | 248/DIG. 6 X |
| 2,073,114 | 3/1937 | Martin et al. | 280/DIG. 6 X |
| 3,182,804 | 5/1965 | Chader | 248/499 X |
| 3,383,738 | 5/1968 | Fox et al. | 24/81 |
| 3,891,174 | 6/1975 | Harvey | 248/499 X |
| 4,153,189 | 5/1979 | Hughes | 224/568 X |
| 5,110,023 | 5/1992 | Colin | 224/901.4 X |
| 5,125,516 | 6/1992 | McKenna | 248/205.2 X |
| 5,288,001 | 2/1994 | Locarno | 224/534 X |
| 5,356,003 | 10/1994 | Gretz et al. | 248/96 X |

FOREIGN PATENT DOCUMENTS 977938  12/1964  United Kingdom ................ 248/205.2

Primary Examiner—Leslie A. Braun
Assistant Examiner—Anita M. King
Attorney, Agent, or Firm—J. Herman Yount, Jr.

[57] ABSTRACT

New and improved strapping for a new and improved strapping system and method of strapping a golf bag to a cradle of a golf bag carrier so as to have taut strapping which is connected to the golf bag and the bag carrier and prevents rotation of the bag and strapping relative to the cradle. The strap or straps of the strapping are made of back to back woven loop tapes with napped loops of the type used for hook and loop re-closeable fasteners with the straps of the back to back tapes having loop material extending for the full length of the opposite sides of the straps and end segments on the end portions of the strap, the end segments having hooks extending outwardly from the side of the strap to enable the end portions of the straps to be doubled back to make connections to a cradle or to the shoulder strap D-ring of a golf bag or a similar independent ring type member. The connecting loops are adjustable to adjust the effective length of a strap and the tautness of the strap across the bag. Various accessories or the golf bag may be fixed to the loop material of the strap by providing them with hooks for a hook and loop fastener. The strap is made of two back to back loop tapes sewed together for essentially the length of the strap with a single center stitch with the end segments being sewed over the loop material at the ends of the strap with box stitches which join the end segments with the hook tapes.

29 Claims, 14 Drawing Sheets

GOLF BAG STRAPPING AND STRAPPING SYSTEMS FOR GOLF BAG CARRIERS

The present invention relates to strapping for, and methods of, strapping golf bags to carts or other golf bag carriers, e.g., tripod type, hand carried caddie stands, which have a cradling structure to which the golf bag is to be strapped and to systems for strapping a golf bag to the golf bag carrier, and especially to a pull type golf bag cart having a center spine or pillar, as well as a collapsible handle and wheel support for collapsing or folding-up the carrier for storage or transport with the golf club bag strapped on the cart, the strapping also comprising means facilitating the attachment to the cart of various golf accessories used by a golfer.

There are various types and makes of pull type golf bag carts, to which the present invention has wide application. Typically these carts are fold-up carts which have a central pillar, or spine, a bottom bag support on which the bag sits, and top and bottom cradles which have spaced arms extending on either side of the bag and for receiving a golf bag with a portion of the bag extending forward of the cradle. The conventional method of securing a golf bag to the upper cradle is to strap the upper portion of the bag in the cradle with strapping which extends, between the cradles, around the bag portion which is forwardly of the cradles, the strapping being tightened against the bag to hold the bag in the cradle and establish a frictional grip between the outside of the bag and the inside of the strapping to hold the bag against rotation relative in the cradle. Corresponding strapping is used to strap the bag to the lower cradle.

Such systems are workable to a limited extent. However, it is difficult to secure and then maintain sufficient tension in the strapping to keep the bag from rotating in the cradles and the friction grip from loosening, particularly the grip of the straps on the upper cradle, while the cart is being used or handled. The difficulty of establishing an initial strong friction grip between the outside surface of the bag and the strapping is due, in part, to the materials used in golf bags and the strapping which normally have a relatively low coefficient of friction. This is complicated by the difficulty of tightening the strapping sufficiently to secure the maximum frictional grip between the bag and the straps. The strength needed to tighten the strapping is more than that of many golfers, particularly women.

Even when the golfer has sufficient strength to effect the maximum frictional grip, a further problem with the present strapping systems is presented by the relative soft structure of many golf bags. In a significant number of bags, perhaps most of those used by golfers, the tightening of the straps to obtain the desired tension in the straps, particularly the straps of the upper cradle, may distort the shape of the bag and actually lessen the friction grip between the bag and the strapping and the resistance of the friction grip and the forces acting against the rotation and loosening of the bag in the cradle.

But even if the strapping is properly tightened by a knowledgeable and strong person, and the bag is one which is relatively rigid, experience has shown that the use on a golf course produces moments and other forces which will loosen the strapping, often due to the shift of the weight of the clubs to one side or the other of the bag, when the cart leans one way or another as on a bounce when one wheel hits a bump, or as the cart is being pulled along a slope. This is also true when the cart, with a bag of clubs strapped to it, is being collapsed for storage or transport, and when a collapsed unit is being placed into a transport vehicle. The weight shift caused by club heads sliding to one side of the bag is a primary cause of the bag rotating in the cradle and the cart tipping. When the bag rotates the compartment dividers lean to one side or the other of the cart to cause the clubs to jumble against each other on one side of the bag even when the cart is level. With the compartment dividers tilted, the plane of each compartment divider is at an angle to a vertical plane causing the clubs to jumble even when the cart is level. This shifts the center of gravity of the cart to one side of the front to back center-plane of the cart. With the shifted center of gravity, the cart is prone to tipping over on rough, uneven, or sloping ground, which frequently causes spilling of the bag and clubs from the cradles, although the bag is still entangled in the strapping.

Another problem with the current strapping is that the tightening for establishing the initial friction grip to hold the bag in place causes sufficient tension to make the strap more prone to grow and loosen under the additional tension forces created by the bouncing or tilting of the cart and allowing the bag to rotate in, as well as to shift outwardly of, the cradle.

One of the reasons that the prior art friction grip strapping has been used, in spite of its shortcomings, is that it has been the only known system which accommodates the securing of various size golf bags to a golf cart at a reasonable cost and without unduly increasing the weight of the cart. While the carts could be designed and manufactured to positively grip or closely surround the bag and hold it against rotation and bouncing, it would be difficult to accommodate various size bags particularly at a low cost. Moreover, it would complicate the design of a light weight cart for pulling and collapsing a the bag of clubs thereon.

Strapping in accordance with the present invention does not rely on a friction grip and significantly reduces and minimizes the occasions when the bag has to be re-strapped or the strapping re-tightened. The strapping need only be tensioned to assure tautness, i.e., no slack or looseness, not to the level required to establish a frictional grip to hold the club bag against rotation in the cradle. Since tautness does not require the high tension force required by a friction grip system, the strapping is not prone to grow with increased tension forces caused by the carrier bouncing along the course, or being tilted on a slope, or during collapsing with the bag strapped thereto, or when handling and transporting the collapsed carrier and bag of clubs secured thereto.

A feature of the present invention is the provision of a new and improved strapping which can easily be set to hold a golf bag on a carrier and will keep the bag in a fixed orientation in a cradle of the carrier without relying on the establishment of a frictional grip between the strapping and the bag to hold the bag in position.

A further feature of the present invention enables a golfer to attach various accessories to the strap in a simple, low cost, releasable manner.

An object of the present invention is to provide strapping and a strapping system for securing a golf bag to a carrier cradle which enables a golfer to easily strap the golf bag to cradle so as to securely hold the bag against rotation in the cradle and to resist the forces tending to loosen or defeat the integrity of the strapping system so that the need to reset the strapping is minimized or eliminated.

It is a further object of the present invention to provide strapping which overcomes or minimizes the problems of the friction grip strapping of the prior art and which is relatively low cost and easy to use, but yet is such that universal strapping or a strapping kit can be readily provided for mostly all golf bag carts or other carriers for a wide range of sizes of golf bags.

An object of the present invention is to provide strapping for securing a golf bag in the cradle of a cart or other carrier with the strapping comprising means for making connections of the strapping to the bag and to the cradle with the connections to the bag and cart effecting a secure positive holding of the bag in the cradle, the strapping being readily usable by the golfer over a wide range of bag sizes.

An object of the present invention is provide a strapping for use in fixing golf bags to a spine type golf cart or other carrier, the strapping being of loop tape for a releasable and re-closeable hook and loop fastener, with loop material covering both sides of the strapping, and of hook tape, the same strapping being usable on mostly all sizes and types of pull type spine carts and other golf bag carriers for essentially the full range of conventional golf bag sizes from the smallest to the largest bags.

SUMMARY OF INVENTION

Strapping and a strapping system for a golf bag to be strapped into a cradle on a golf bag carrier with the bag having a forward portion extending outwardly of the cradle against which the strapping is tautly drawn tautly drawn to strap the bag to the cradle, the strapping having strap portions extending from each side of cradle across the forward portion of the bag with first fastening means connecting the golf bag against turning relative to said strap portions, and second fastening means for connecting the strapping to the cradle to fix the strapping against movement outwardly from either side of said cradle.

The preferred strapping of the invention comprises hook and loop fastener tape having loop material covering the side faces of the strapping with the strap having an end segment at each end comprising hooks protruding outwardly from the strap for cooperating with the loop material on the sides of the strap to form adjustable connecting loops for securing and holding the strapping tautly across a golf bag strapped to the bag carrier. Strapping in accordance with an aspect of the invention comprises straps composed of back to back loop tapes for a hook and loop fastener with each loop tape having a woven base and napped loops and hook tapes secured to the end portions of the loop tapes. The strapping extends across the bag on the cradle from each side of the cradle to a shoulder strap D-ring mounted on the golf bag, or to an independent cinch ring(or buckle) located adjacent the bag centrally and forwardly of the cradle. The straps are connected to the cradle and to the D-ring or the cinch ring, preferably by connection loops, with the straps being drawn taut across the golf bag when making the connection loops to the D-ring or cinch ring, or to the cradle. When connection loops to the cradle and/or D-ring (or cinch ring) have been made and adjusted as necessary to draw the straps taut across the bag, the straps positively hold the golf bag against rotation relative to the strapping and the cradle. If the straps are connected to make connection loops to a cinch ring or buckle instead of a D-ring on the golf club bag, a fastening connection between the golf bag and the straps or the cradle is required to keep the bag from rotating and an auxiliary fastening connection is used, preferably a fastening connection comprising hook tape with hooks for cooperating with the loop material on a strap to adjustably locate the connector in a proper position on the strapping to connect the bag to the strap and hold it against rotation relative to the strapping. Preferably this fastening connection comprises a female snap fastener part which snaps over the male snap fastener part on the bag for attaching a hood to the bag. In an alternative strapping of the bag, a single strap may be used which extends across the bag between the outer ends of a cradle with adjustable connection loops being made to the outer ends of the cradle, the strap being drawn taut by adjusting the return lengths of the loops of the connections when making the connection loops to the cradle, a connection of the strapping to the golf bag being made while making the connection loops using the described hook and loop fastening connector between the strapping and the golf bag to fix the bag against relative rotation with respect to the strapping. A less preferred embodiment utilizes a single strap, preferably of hook and loop material in accordance with the preferred strapping of the invention, the strap encircling the bag and its cradle with the opposite ends of the strap being connected adjacent the front of the bag by overlapping end lengths of the strap with a releasable and re-closeable hook and loop fastener between the overlapped end lengths or by the end lengths of the strap making connection loops to a buckle(cinch ring) or bag D-ring at the front of the bag with connection loops being adjusted to cause the strap to be taut against the bag. As the overlapping connections or the connection loops to a cinch ring are being made, a hook and loop fastener connection is made between the strap and the bag to hold the bag and strap against relative rotation, the strap, in turn, being held against relative rotation with respect to the cart by providing a hook and loop fastening swatch on the cradle with the swatch having hooks for interdigitating with the loop material of the strap. In this mode, the strap is pressed against the hook swatch when the cradle is initially encircled with the strap and before making the final connection loop to the buckle or D-ring. The invention also contemplates that with some cradles and strapping systems, a connection to keep the bag from turning may be made, less desirably, directly to the cradle by using hook tape on one and loop tape on the other, both independent of the strapping.

As noted, the preferred embodiments utilize hook and loop strapping connected by adjustable loops to the ends of the arms of an upper cradle on a golf bag cart or other bag carrier and, in the most preferred embodiments, two tie straps are used, a respective one being connected to a respective side of the cradle, with the straps making connection loops with the D-ring of the golf bag or with a buckle approximately along the vertical center line plane of the cart cradle. In these embodiments, as well as the single strap embodiment having the straps ends connected by connection loops to the cradle, each strap comprises an intermediate length extending between end lengths at either end of the strap, the end lengths being the length of strap which is doubled back, i.e., returned along the strap, to form the return side of the loop. These return end lengths are of variable lengths with the intermediate length varying inversely with the total length of the end lengths as adjustments in the connection loops are made to adjust for different size bags and arrangements and to provide taut straps.

In embodiments in which a strapping or combined strapping encircles the cradle the outer end lengths of the strapping may be connected to a golf bag D-ring or overlapped and interconnected by hooks on one or both engaging the loop material on the other strap with connections using a hook and loop fastener being made to each of the bag and cradle to prevent relative rotation between the strapping and the bag and the cradle.

An aspect of the present invention, is the provision of hook and loop strapping suitable for mostly all carts and bag sizes. The strapping is of a length which provides the necessary intermediate length and end lengths for the largest size of bag which may be put onto the carts. With the largest size bag, the return end lengths of connection loops will be shorter and respectively connected to the intermediate length only a short distance from both the D-ring for the shoulder strap or buckle at one end and from the respective cradle arms at the other end, or in a single strap embodiment, only a short distant from the sides of the cradle with which the ends of the strap make connection loops. This allows the strapping to be used on the smallest size bag by lengthening the return end lengths to reduce the intermediate length between the D-ring and the cart. If desired or needed the return lengths may be overlapped to secure a proper intermediate length for a small bag. In addition, an aspect of the present invention is the provision of a universal kit for strapping various size bags to the cradle of a golf bag cart or stand with the kit containing hook and loop straps having the novel features described herein for use in various modes or styles of strapping a bag to a cart or stand to prevent rotation of the bag in the cradle and auxiliary parts which may be required to complete a specific system, the kit containing at least two hook and loop cradle straps for securing the bag in a cradle, a female snap fastener for connecting a strap to a male snap fastener part on the bag with female snap fastener having hook material on its base for connection to the loop material of a cradle strap, and hook swatches for use with pressure sensitive adhesive on the back for fastening the swatch to the cart or to the bag to enable a hook and loop connection to be made to the loop material of the strapping. Such a kit enables a golfer to select from various modes of strapping in accordance with the disclosure made herein to fix the bag against rotation in a cart cradle or a bag stand cradle without worrying about the size of bag the golfer wants to into the cradle.

A feature of the present invention is the use of a tie strap of woven loop tape, the strap preferably being back to back loop tapes to provide a having a facing of loop material for essentially the full length of both its sides with the end return lengths terminating in respective end segments having a hook tape on at least one side of each end segment to enable a hook and loop connection of the return end lengths to the intermediate length, or if desired to interlock overlapping return end lengths.

The use of strapping in accordance with the various aspects of the present invention also enables various accessories which a golfer uses during golfing to be easily attached to the loop material of the strap for availability while golfing.

DESCRIPTION OF THE DRAWINGS

The following is a description of drawings of the preferred embodiments of the present invention which constitute a part of this specification for all matter disclosed therein and in which.

DESCRIPTION OF THE PREFERRED EMBODIMENTS

Figure 1:
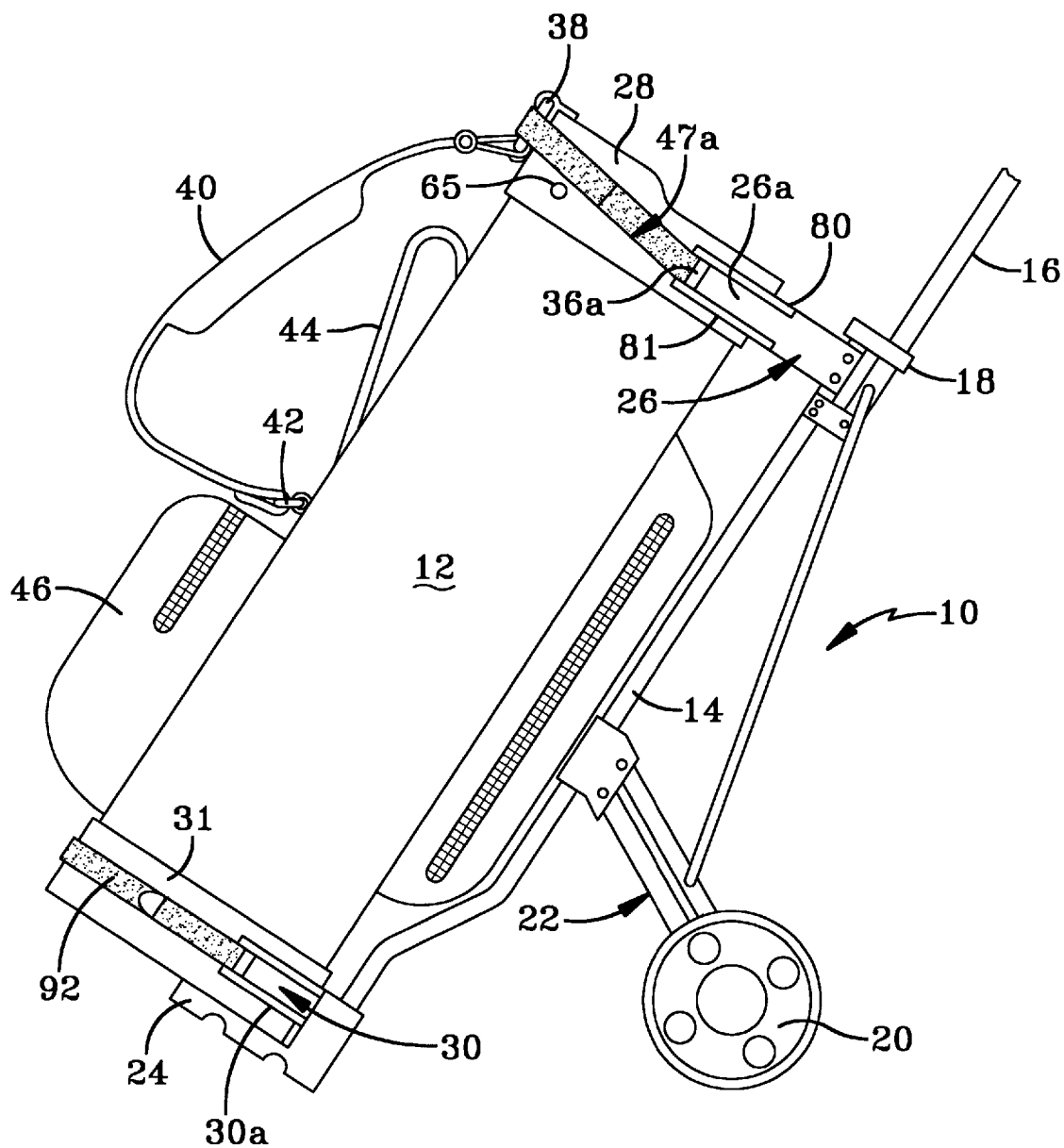
FIG. 1 is a side elevational view of a golf bag cart having a golf bag strapped thereto by a strapping system and strapping embodying the present invention.

Referring to the drawings, FIG. 1 illustrates a collapsible pull type golf cart 10 having a golf bag 12 mounted thereon. The golf cart 10 has a central spine (or pillar) 14, a conventional folding or telescoping handle 16 extending upwardly from a mounting 18 therefor at the top of the spine, and a wheel 20 on either side of the cart with the wheels being mounted to the spine by a collapsible linkage 22. The golf bag 12 sits on a bottom support 24 on the lower end of the spine, and the top portion of the bag 12 is received in a conventional upper cradle 26 which receives the conventional top collar 28 around the top of the golf bag, although on some carts and bags the cradle may engage the bag immediately below the collar or the bag may have no collar.

The bottom portion of the bag 12 is also cradled by a lower cradle 30 which receives the conventional lower bag collar 31 surrounding the lowermost portion of the golf bag, the lower cradle 30 being supported from the spine immediately above the bottom support 24.

The upper cradle 26 has two spaced arms 26a, 26b including a curved cradle wall 32 which defines an open configuration for receiving the golf bag between the outer ends of the arms 26a, 26b, the outer ends having strap slots 36a, 36b for respectively receiving strapping to secure the bag in the cradle.

Figure 2:
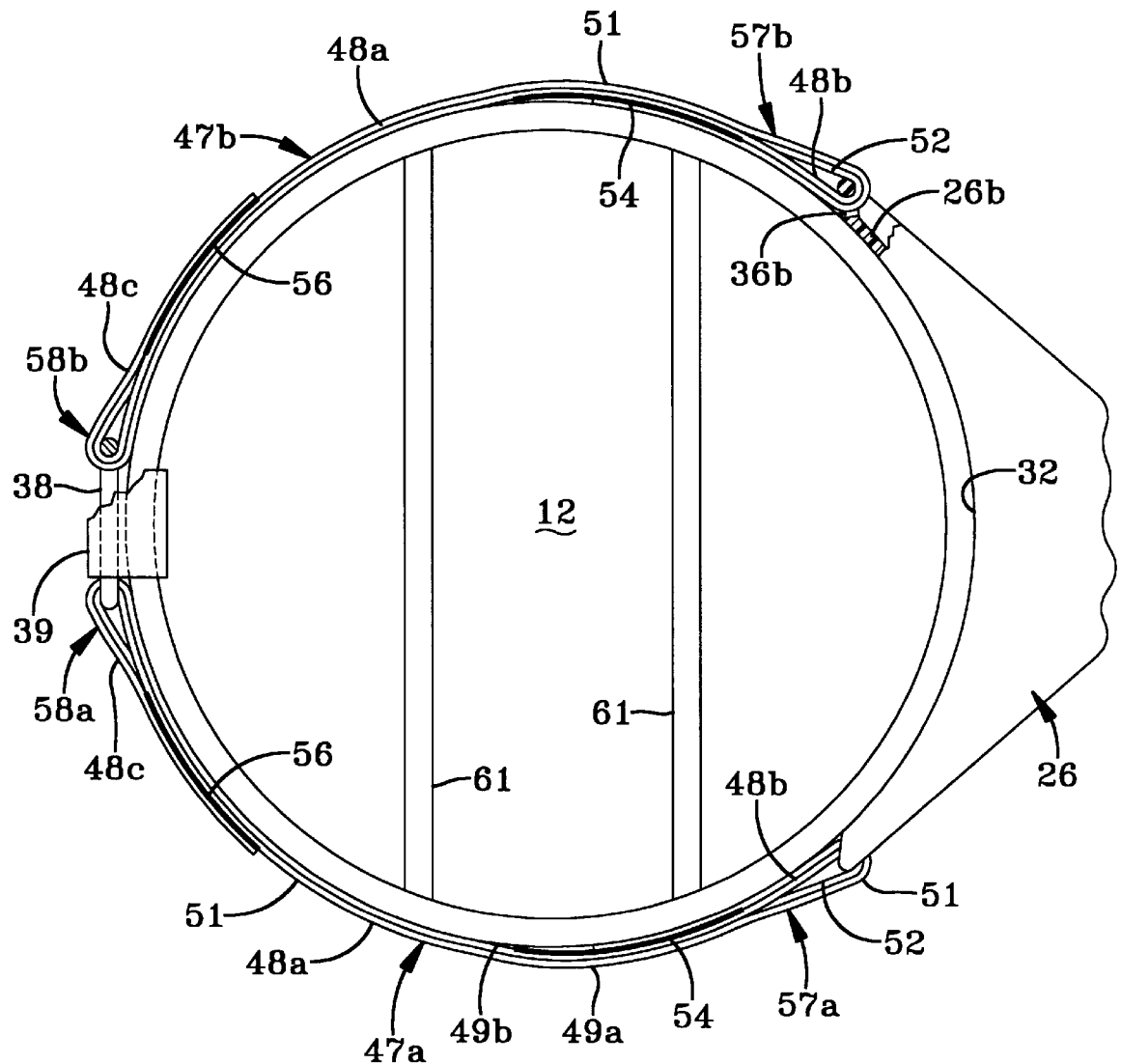
FIG. 2 is a fragmentary plan view looking at the top of the cart cradle of the cart of FIG. 1 with a golf bag strapped in it.
Figure 3:
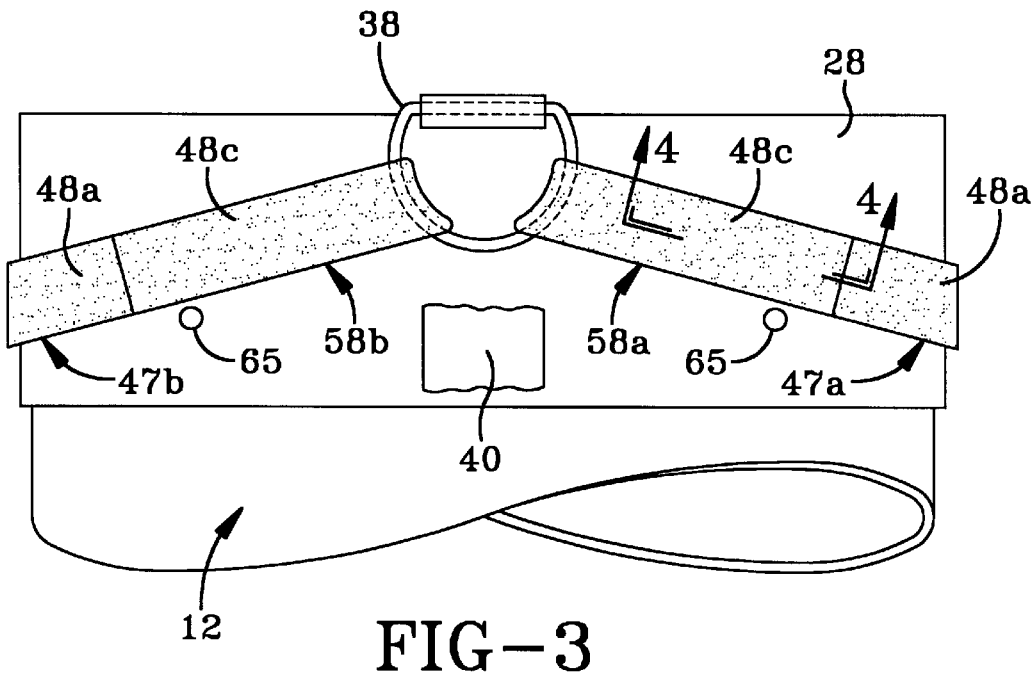
FIG. 3 is a front elevational view of cradle and bag shown in FIG. 2.
Figure 4:
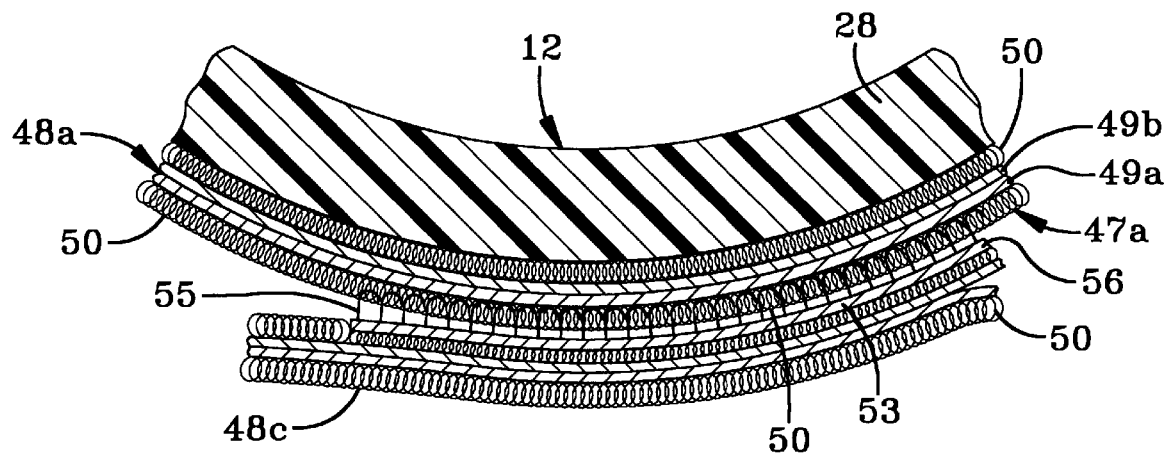
FIG. 4 is a fragmentary cross sectional view taken along the line 4—4 of FIG. 3.

The lower cradle 30 similarly has two arms, an arm 30a and a corresponding arm on the other side of the cradle, not shown in FIGS. 1–3 which together with the curved wall 32 of the cradle 30 define an open generally circular configuration for receiving the bottom collar 31 of the golf bag.

The structure described is typical of the structure of mostly all collapsible pull type golf carts that are currently being used with the strapping of the present invention being applicable to essentially all such carts. The present invention is also useful in other type carts and hand carried stands as will be appreciated by those in the art from the description of the various embodiments herein.

A feature of the preferred embodiment of the invention is that the strapping for holding the golf bag on the carrier is connected to a part fixed on the golf bag to hold the bag from rotation in the receiving cradle. Preferably the connection is made to the conventional D-ring 38 for connecting the shoulder strap 40 to the top collar 28 of the golf bag. The D-ring, while swiveling on an horizontal axis, has a fixed axis position in a ring mounting 39 connecting it to the top collar 28 and precluding translatory movement of the D-ring relative to the bag. Thus rotation of the bag in the cradle is precluded when the D-ring is tied by the strapping to the two cradle arms. The bottom of the shoulder strap is also connected to the bag by a bottom ring 42, and a conventional hand carrying handle 44 is mounted on the bag intermediate the rings 38, 42 for the shoulder strap. Additionally, a golf ball and gear carrying compartment 46 is located below the shoulder strap.

As illustrated in FIGS. 1 and 2 of the preferred strapping system, the golf bag is positioned on the cart with the shoulder strap forward of and central between the cradle arms 26a, 26b. In this position, the shoulder strap is positioned in the front to back centerline plane of the golf bag 12, cradle 26, and spine 14.

Figure 5:
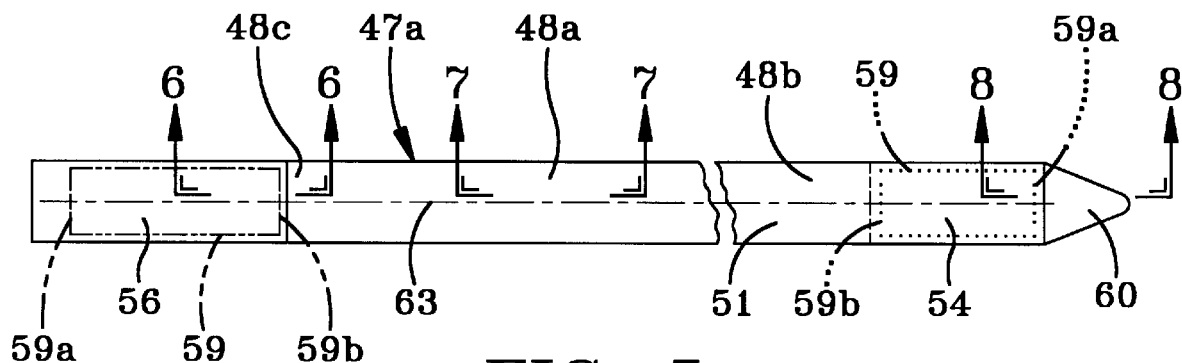
FIG. 5 is top plan view of a one side of strapping used in the strapping embodiment of FIGS. 1–4.
Figure 6:
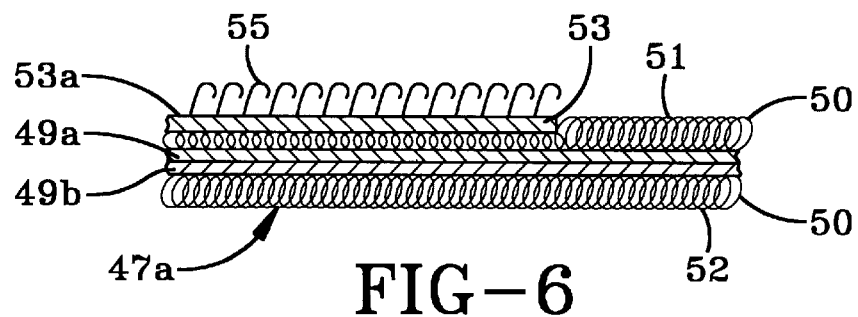
FIG. 6 is a fragmentary horizontal cross-sectional view of the strapping as shown in FIG. 5 and is taken along the line 6—6 FIG. 5.
Figure 7:
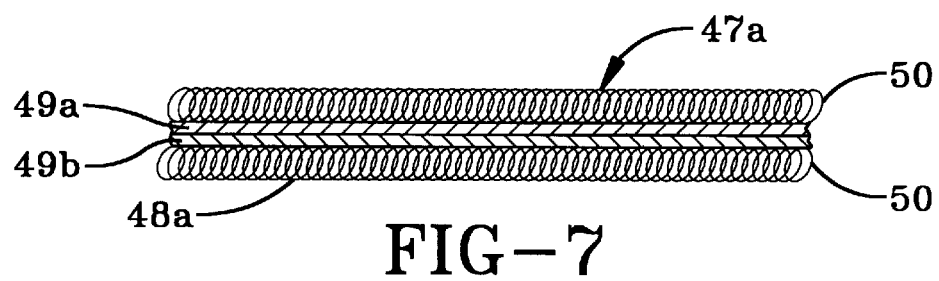
FIG. 7 is a fragmentary horizontal cross-sectional view of the strapping as shown in FIG. 5 and is taken along the line 7—7 of FIG. 5.
Figure 8:
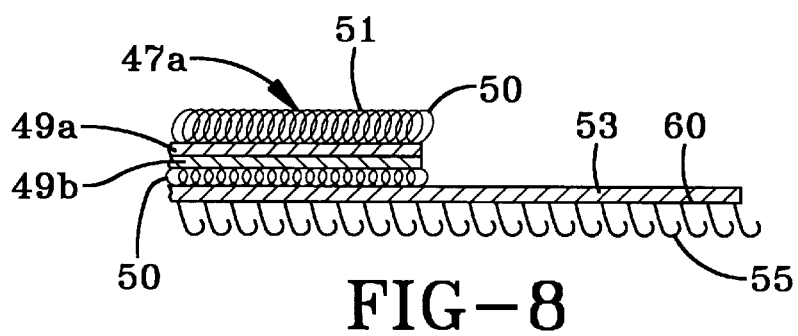
FIG. 8 is a fragmentary horizontal cross-sectional view of the strapping as shown in FIG. 5 and is taken along the line 8—8 FIG. 5.

In the preferred embodiment, the bag is strapped to the cart by identical tie straps 47a, 47b. The structure of tie strap 47a is shown in detail in FIGS. 5–8 with the understanding that the strap 47b is identical. Referring to FIGS. 5–8, the strap 47a is of releasable hook and loop fastening tape and comprises back to back loop tapes 49a, 49b having a woven base, or back, and a napped loop. The tapes are sewn to each other, to provide a double faced strap having a facing of loop material 50 for cooperation with hooks for effecting a hook and loop re-closeable fastening connections. The loop material of the laminated loop tapes comprises the opposite side faces 51, 52 of the strap 47a. See FIGS. 5–8. The loop material covers both sides of the strap 47a for the full length of the loop tapes 49a, 49b. At the ends of the strap, hook tapes 53, 53a are sewn over the loop material on the strap to provide respective end segments 54, 56 having hooks 55 protruding outwardly from the opposite faces of the strap at the opposite ends of the strap. The hooks of each end segment 54, 56 are adapted to cooperate with the loop material on a strap to effect a re-closeable hook and loop fastener connection when the respective end segment is doubled back along a respective side of the strap and the hooks which project therefrom are interdigitated with the loop material 50 of the strap. This forms a connection loop for securing the respective end of the strap to a cradle arm, or a D-ring or ring member, e.g. a buckle. In sewing the hook segments to the loop tapes, each end segment 54, 56 is pressed against and crushes, to a large extent, the loop material under the segment. The end segments may be sewed to the loop tapes, by way of example, with the box stitch 59, as shown in FIG. 5, having cross stitchs 59a, 59b. As explained hereinafter, the box stitch for segment 56 is preferably offset inwardly of the outer end of the strap 47a to provide more peel resistance for a hook and loop connection made by the end segment.

In the preferred embodiment, the hook tape 53 of the end segment 54 has a triangular tab 60 which extends beyond the end of the loop tapes 49a, 49b while the hook tape 53a is coterminous with the end of the laminated loop tapes 49a, 49b. The triangular tab 60 of the hook tape enables the strap to easily thread through either of the slots 36a, 36b in the arms of the cradle. The squared end segment 56 will readily pass through the D-ring 38 when forming a connection loop to the D-ring, but it is also of a size to fit through the slots 36a, 36b, if so desired, since the end is no wider than the strap itself.

A hook and loop re-closeable fastener strap, from the description herein, can be fabricated readily by whose in the business of manufacturing and supplying hook and loop re-closeable fasteners. Preferably, the woven back to back loop tapes used in strapping according to the present invention have a novel single straight line stitch 63 centered between the edges of the back to back tapes and extending the full length of the tapes for interconnecting the tapes 49a, 49b for their full length, with cross stitching across the tapes immediately adjacent each end of the loop strap to sew the tapes together at each end of the strap.

The loop tapes 49a 49b are woven tapes of monofilament nylon with the loop material having a napped finish accomplished by those working in the art by randomly disorienting, by known commercial methods, the loops of the loop material 50.

The hook tapes 53, 53a of the strapping are, in accordance with the invention, preferably flexible tapes of woven monofilament nylon or polyester with preferably about 300 hooks per square inch with a shear strength of about 14 psi and a peel strength above 1.00 psi, preferably about 1.20 psi, of engaged hook area. Instead of woven hook tapes, equivalent molded flexible plastic with hooks may be used.

The individual woven loop tapes, woven hook tapes, and molded hooks of flexible plastic as specified are commercially available from various suppliers of hook and loop re-closeable hook and loop fasteners. However, the components for assembling hook and loop tapes into strapping as described herein are also available in bulk for sewing and assembly by others and the bulk components, in and of themselves, do not form a part of this invention.

In accordance with the preferred embodiment as illustrated in FIGS. 1–4, the two tie straps 47a, 47b tie the D-ring 38 of the golf bag to the outer ends of the arms 26a, 26b of the upper cradle 26. In the strapping system, the straps 47a, 47b each have an intermediate length 48a which extends across the golf bag 12 between the D-ring 38 and the outer end of a respective one of the cradle arms 26a, 26b with each strap extending through the D-ring and through a respective one of the strap slots 36a, 36b in the cradle arms 26a, 26b respectively so as to form connection loops 57a, 57b with a respective one of the cradle arms and respective connection loops 58a, 58b with the D-ring 38. An intermediate length 48a of each strap extends between the cradle arm and the D-ring and constitutes one side of the respective connection loops of the strap while end lengths 48b, 48c terminating in end segments 54, 56 of each strap constitute return end lengths of the respective loops at the D-ring and cradle arm respectively. In the connection loops 57a, 57b, 58a, 58b, the respective end lengths 48b, 48c of the straps 47a, 47b double back along the intermediate length 48a of the respective strap to connect the hooks 55 of the respective end segments 54, 56 with the loop material 50 of the intermediate length 48a. The connections of the hooks of the end segments 54, 56 of the respective straps 47a, 47b to the loop material of the respective intermediate lengths 48a are continuously adjustable along the intermediate lengths 48a to vary the length of the respective intermediate length so as to enable practically all conventional sizes of golf bags sizes to be strapped to the cart.

Referring to FIGS. 1 and 3, when initially strapping a golf bag to the cart, the triangular tab 60 on the end segment 54 of the strap 47a may be threaded through the slot 36a in the arm 26a from the outside in, with the hook side of end segment 54 facing outwardly of the cradle, so as to double back along the the strap to form the return end length 48b of the connection loop 57a, the return end length 48b having an approximate length such that the intermediate length 48a and the other end return end length 48c have a total length for effecting a connection loop to the D-ring 38. After threading the end length 48b of the strap 47a through the slot 36a in the arm 26a and doubling the return length back on the intermediate length, the connection loop 57a may be made by pressing hooks 55 of hook end segment 54 into the loop material of the inside face 52 of the intermediate length 48a.

To make the connection loop 58a of the strap 47a to the D-ring, the end segment 56 of the strap end length 48c is looped through the D-ring from the inside out and pressed into the adjacent face 51 of the intermediate length 48a to make the connection loop 58a. In making the connection loop 58a, the end length 48c of the strap 47a, having been inserted through the D-ring from the inside out, is doubled back along the outside face of the intermediate length 48a, and pulled to draw the strapping taut against the outside of the golf bag before pressing the hooks 55 of end segment 56 into the loop material on the outside of the intermediate length 48a. While the strap 47a is pulled taut through the D-ring to make the connection loop 58a, the golf bag 12 may be held manually in its central position in the cradle so that the intermediate length and the end length are adjusted to make the strap 47a taut around the side of the golf bag, the bag being held with its shoulder strap in a central position in the cradle. If the return end length 48c of the strap 47a is too short to effect the connection loop 58a, the end length 48b of the connection loop 57a to the cart arm may be reset to shorten the end length 48b as is necessary for providing a proper length for the return end length 48c at the D-ring to make the connection loop 58a. In the case of a smaller bag, the return length connection loop 48b may have to be lengthened or shortened if the estimated initial setting of the return length 48b is to short or too long.

After the strap 47a has been connected between the cradle arm 26a and the D-ring 38, the strap 47b is connected between the cradle arm 26b and the D-ring 38 in the same manner as the strap 47a by making the connection loops 57b and 58b. If convenient, the connection loop 57b to the cradle may be made at the same time the first cradle loop 57a is made. While making the connection loop 58b of the strap 47b to the D-ring 38 and before making a hook and loop fastener connection of the return length to the intermediate length of the strap 47b, the strap 47b is pulled against D-ring 38, which is now held by the strap 47a, to draw the strap 47b taut. If, when the strap 47b is pulled taut, the shoulder strap 40 is not in its center-line plane position, the connection loops to the cradles or the D-ring for the strap 47a or 47b, or both, as appropriate, may be loosened and reset to adjust the intermediate length of the strap 47a or 47b or both to locate the shoulder strap in centrally in the cradle.

With the shoulder strap centrally positioned at the front of the bag the conventional compartment dividers 61, see FIG. 2, which divide the conventional golf bag into club compartments, two such dividers to establish three compartments in the illustrated embodiment, are perpendicular to the vertical front-to-back centerline plane through the cart cradle so that the dividers do not slope or tilt toward one side or the other of the bag enabling the clubs to be distributed along the divider without sliding to one side or the other. With the clubs distributed along the dividers, the center of gravity is essentially inside the wheels of the cart near or at the vertical centerline plane of the cradle and the weight of the cub heads does not tend to rotate the bag in the cradle. If the cart is titled to one side during cart bouncing or while being pulled along a slope, the club compartments will tilt to one side or the other and the clubs will slide toward jumbling on one side of the bag to concentrate the weight of the club heads on that side of cart. With the cart coming back to level, the dividers return to a position with no sideways slope and the club shift may be caught prior to jumbling but if they have jumbled the weight shift will not produce a rotation of the bag relative to the straps or cart or loosening of the straps so that resetting of the strapping is required. If the bag rotated in the cradle with a tilt of the compartment dividers toward one side or the other, the clubs will always be jumbled with the weight centered to one side of the cart when the bouncing or leaning of the cart occurs. Then the cart is more prone to tipping over. Moreover, some golfers, who value their clubs will re-strap the bag, if for no other reason than to protect the club heads from battering each other. Other golfers, to solve the problem of the clubs shifting to one side or the other which causes moments acting to rotate the golf bag and acting to loosen strapping, will actually strap the bag in the cart so that the dividers are parallel to the front to back centerline plane of the cradle plane of bag to avoid bag rotation in the cradles and loosening of the friction type strapping. While this will jumble the clubs at the front side of the golf bag as it is mounted on a pull type cart the weight distribution laterally of the cradle will remain evenly distributed because the clubs will not jumble to one side or the other of the cradle.

As is apparent from the foregoing, in the preferred strapping system of FIGS. 1–4, the upper D-ring 38 is tied to the upper cradle in a central position by two tie straps 47a, 47b connected between the D-ring 38 and the arms of the upper cradle 26 and that the two tie straps positively hold the ring against rotation or movement toward or away from either cradle arm.

Once the straps have been properly set to hold the bag in the cradle, to remove the bag, the connection loops 58a, 58b only need be released by pulling the ends of the straps to peel apart the hooks of the end segments 56 from the loop material 50 of the straps 47a, 47b. To again strap the bag to the cradle, the ends of straps need only be inserted through the D-ring and pulled taut to reestablish the connection loops 58a, 58b as was done when first strapping the bag to the cart.

The novel tie straps 47a provide a new and improved strapping for mostly all carts and bags. With the largest size bag, the end lengths 48b, 48c will be respectively connected to the intermediate length 48a only a short distance from the D-ring and the cradle end.

Figure 9:
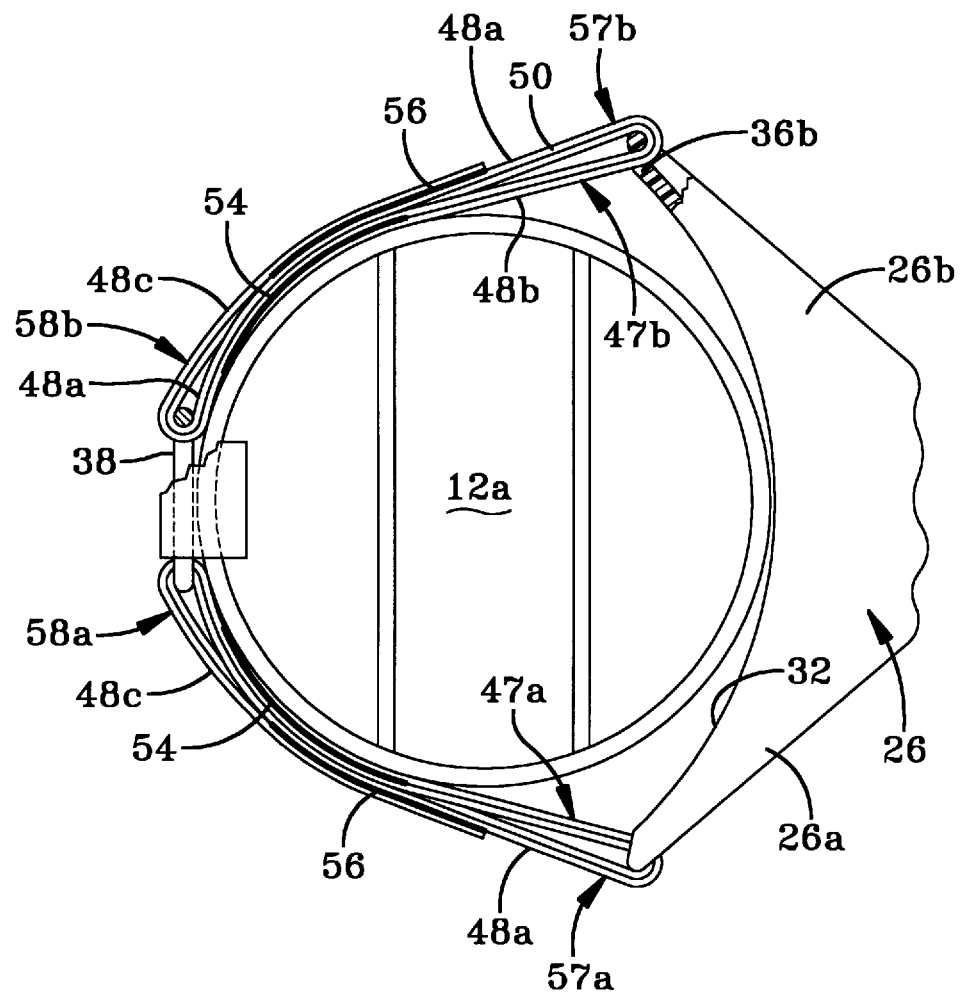
FIG. 9 is a fragmentary top plan view corresponding to FIG. 2 of the strapping embodiment of FIGS. 1–4, but illustrating a smaller size bag in the cradle.

FIG. 9 illustrates the strapping embodiment of FIGS. 1–4 with a small size bag 12a strapped to the cart rather than the large size bag of FIGS. 1–4. With the club bag 12a, the return end lengths for the connection loops 57a, 57b to the cradle are such that the end segments 54, 56 are pressed into the loop material of the intermediate length 47a almost at the D-ring 38 so as to shorten the intermediate length 48a and the lengthen the return end lengths 47b of the loop connections 57a, 57b. It will be noted that on the smaller size bags, the length of engagement of the straps with the outside of the bag is greatly reduced. This would make it extremely difficult to obtain any sort of a friction grip required by conventional strapping.

In the strapping shown in FIGS. 1–9, the hook and loop material extends for substantially the full length of the straps on either side of the straps and provides the capability to overlap the return end lengths and the intermediate length for only a short distance when forming connection loops 57a, 57b and 58a, 58b at the cradle arms and at the D-ring 38 respectively to accommodate the maximum size bag for a cradle, or to overlap for increasing distances to shorten the intermediate lengths to accommodate smaller size bags down to a minimum size bag for which the return end lengths of the connection loops essentially fully overlap the intermediate lengths of the straps with the ends of return lengths 47b adjacent the D-ring and the ends of return end lengths 47c adjacent the cradle arms. in the illustrated embodiment, straps which are, e.g., 21 inches long can be used with golf bags from about 11 inches in diameter to bags of about 7 inches in diameter, the size range of commonly used golf bags.

It can be appreciated from the description of the strapping system of FIGS. 1–4 and that of FIG. 9 that the present strapping is such that there are no loose hanging straps regardless of the size of bag, contrary to the known strapping systems capable of handling a range of bag sizes. Moreover, When the golf bag carrier has no bag thereon, it will be appreciated that the straps of the present invention, rather than hanging loose, may be stretched across the cradle opening in an overlapped relationship and the hooks on the end segment on one strap pressed into the loop material on the adjacent side of the other strap.

While in the strapping arrangement of FIGS 1–4 and 9, the squared end of the strap 47a with end segment 56 has been described as being used to make the connections D-ring, it will be understood that it is entirely within the spirit of the present invention, if the golfer so desires, to reverse the straps 47a, 47b end for end and to use the squared to make the loop connection to the cradle. Some golfers may rather have the return length at the D-ring formed with the end length 48b having the end segment 54 with the tab 60. This end segment is somewhat easer to peel open than the squared end segment of end length 48c and when the loop is completed it is easier to identify the end of the return length against the background of the loop material of the strap.

Referring to FIGS. 10–13, the strapping of FIGS. 5–8 is used to tie a golf bag 12b, corresponding to the golf bag 12 of FIG. 1 but having no shoulder strap or strap D-ring, to the upper cart cradle 26 of the cart 10. In this embodiment of the present invention, straps 47c, 47d, identical to the strap 47a of the embodiment of FIGS. 1–4, are connected to the cart cradle, and make connection loops 57c and 57d with the cradle arms 26a, 26b, which connection loops correspond to the connection loops 57a and 57b in the first described embodiment and connection loops 58c, 58d to an independent D-ring or buckle member 62, which connection loops correspond to the connection loops 58a and 58b of the embodiment of FIGS. 1–4. However, since the buckle 62 is not fixed to the golf cart, it cannot provide a positive holding connection between the golf bag and the strapping or cart. To make a positive holding connection to the golf bag, a female snap fastener part 64 is attached to the loop material 50 of one of the straps, the strap 47d in the illustrated embodiment, so as to engage a round headed male snap fastener part 65 which is one of the plurality of the male snap fasteners that golf bag manufacturers conventionally mount on the bag for the purposes of attaching a hood to cover the tops of the golf bag and the clubs therein.

Figure 13:
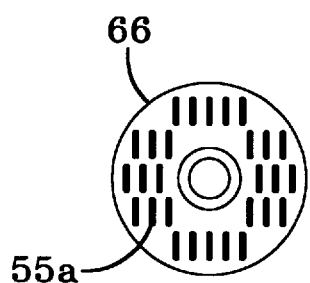
FIG. 13 is a an elevational view of the fastener of FIG. 12 viewing the fastener from the left hand side of FIG. 12.
Figure 12:
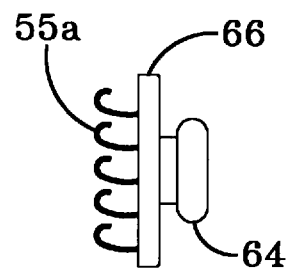
FIG. 12 is a side elevational of a female snap fastener used in the strapping arrangement of FIGS. 10 and 11.

As shown in FIGS. 12 and 13, the female snap fastener part 64 is mounted on a base 66 having hooks 55a for forming a hook and loop fastener with the hooks being such as to interdigitate with the loop material 50 of the strap 47d to secure the female part to the strap. The base and hooks may be of a conventional molded hook piece for a hook and loop fastener connection or formed by gluing a woven or knitted hook tape to a base for the female snap fastener part.

The strapping of the cart and bag using the buckle 62 and snap fastener part 65 for the hood basically follows that of the embodiment of FIGS. 1–4. However, the bag is first located on the cart or carrier so that any bag compartment dividers extend perpendicularly to the front to back center plane of the cradle, which is the same as the orientation of the dividers when a bag with a shoulder strap is positioned with the shoulder strap forwardly and centrally in the cradle.

Figure 10:
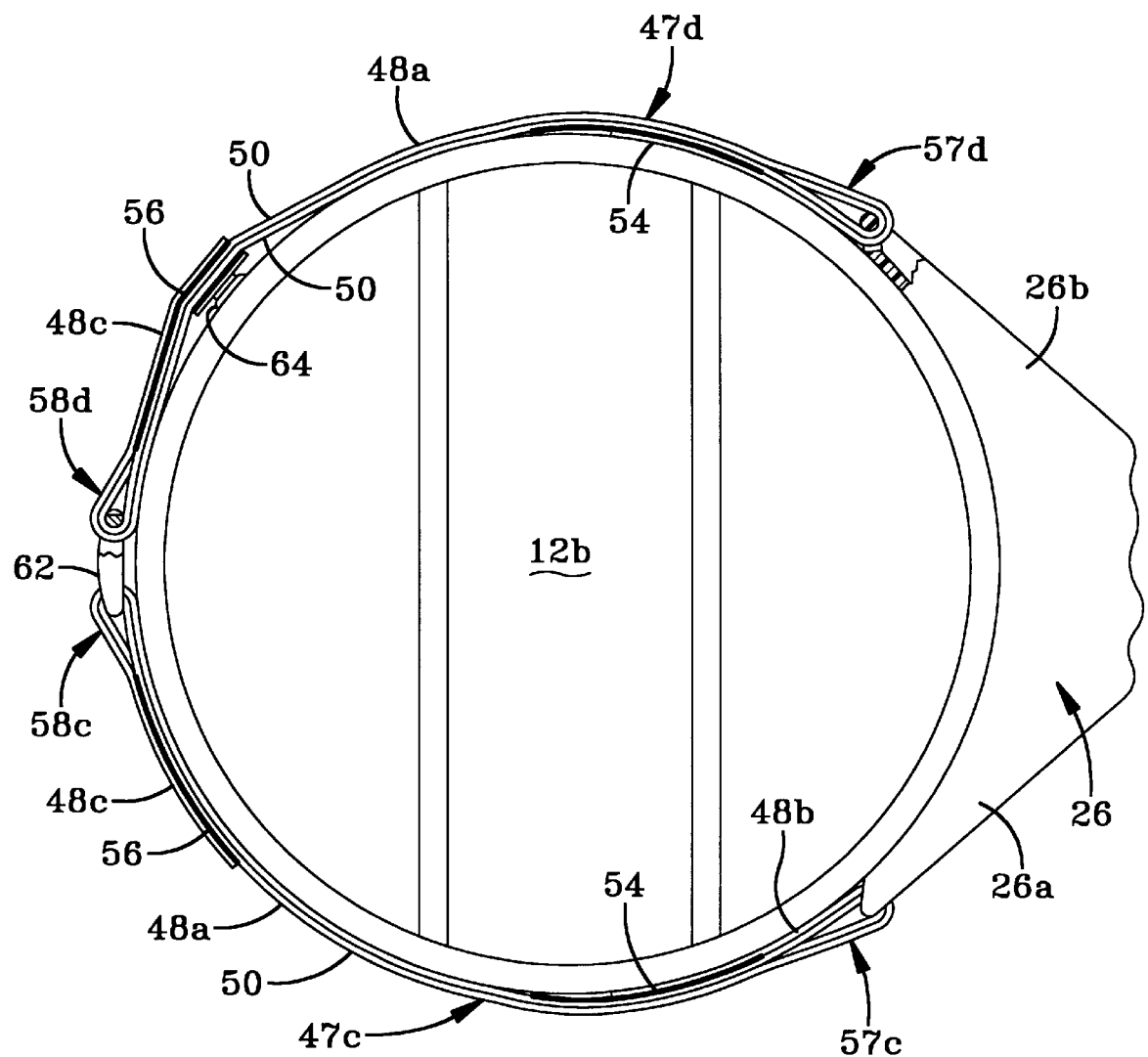
FIG. 10 is a fragmentary top plan view corresponding to FIG. 2 of the embodiment of FIGS. 1–4, but illustrating a modified strapping arrangement.
Figure 11:
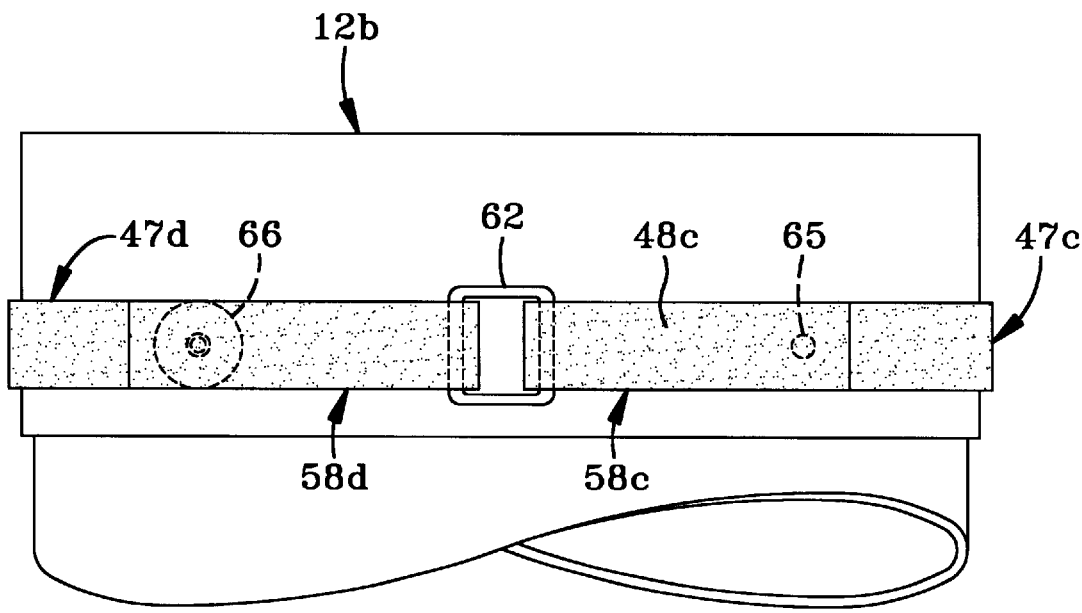
FIG. 11 is a fragmentary front elevational view of the cradle and bag of FIG. 10 looking from the left side of FIG. 10.

Referring to FIGS. 10 and 11, the strap 47c may be first connected to cart arm 26a with a connection loop 57c corresponding to the connection loop 57a of the first described embodiment. When this connection is made, the buckle 62 is held close to the bag in the centerline plane of the cradle to determine the proper intermediate length 48a necessary to locate the buckle in essentially the same position as the D-ring 38 of the first described embodiment and a connection loop 58c made to one side of the buckle 62. When this is done, a connection loop 57d is made to the cart arm 26b in the same manner as connection loop 57b of the first described embodiment. With this connection loop made, the strap 47d is pulled taut along the side of the bag over the male snap fastener part 65 on the bag. With the strap taut, the proper location for the female snap fastener part 64 on the strap is determined, the strap slackened, and the hooks 55a on the base 66 of the fastener part 64 pressed into the loop material of the intermediate length of the strap 47d. Then the strap is again pulled taut and the female fastener part 64 snapped over the male part 65 on the golf bag. With the strap 47d now connected to the bag, the connection loop 58d to the buckle 62 is made. When the strap is drawn taut through the buckle from inside out, the hooks on the end segment 56 of the strap 47d are pressed into the loop material 50 on the outside of the strap to form the connection loop 58d.

Figure 14:
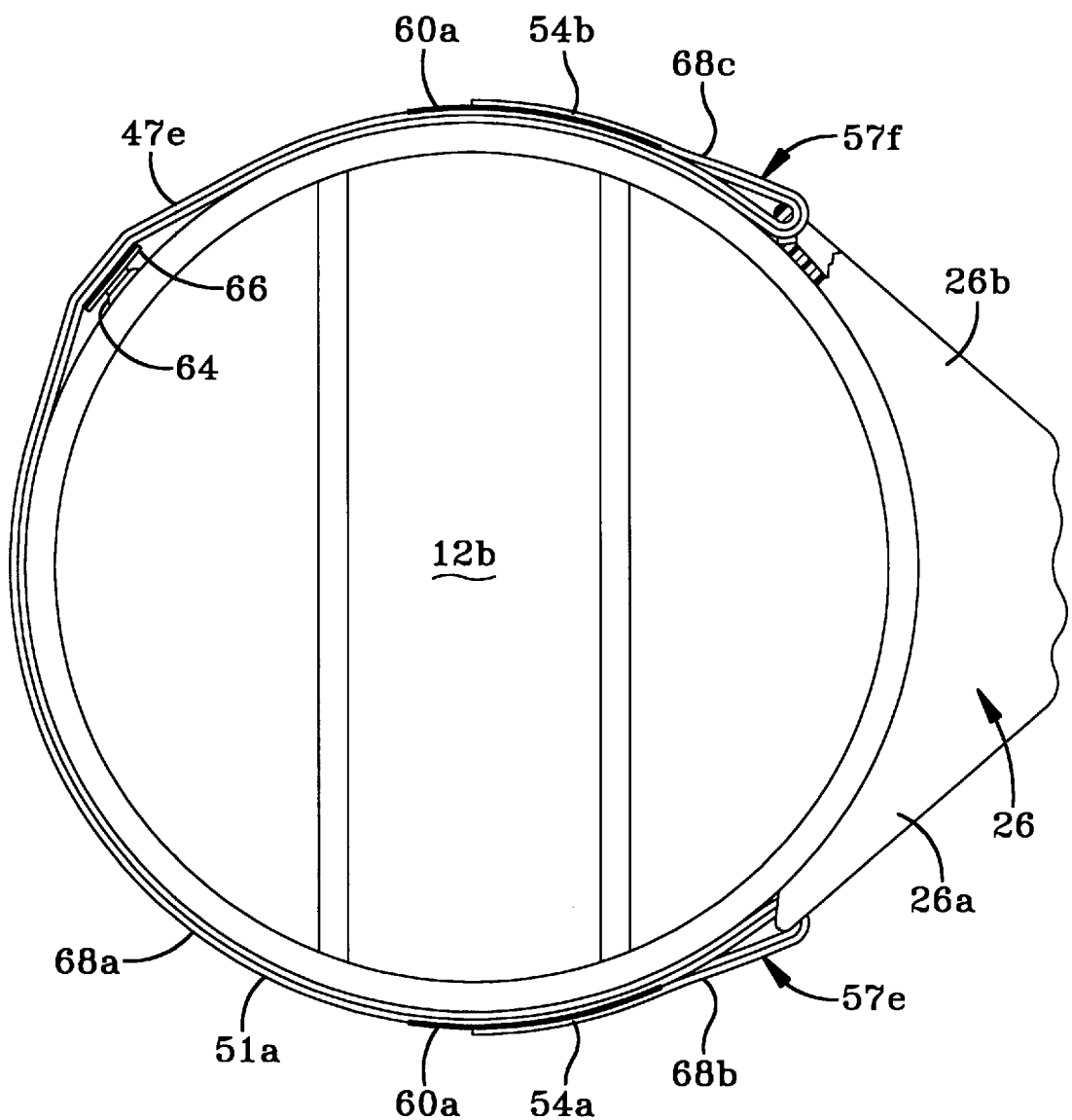
FIG. 14 is a fragmentary top plan view of a cart cradle corresponding to the cradle of FIG. 2 but with an alternate strapping arrangement.

FIG. 14 illustrates an embodiment of the present invention in which the golf bag 12b shown in the strapping embodiment of FIGS. 10–13 is secured in the upper cradle 26 by a single strap 47e connected between the cart arms 26a, 26b with an intermediate length 68a of the strap extending between the cradle arms and end lengths 68b and 68c constituting return end lengths for making connection loops 57e and 57f at the cradle arms 26a and 26b respectively. The strap 47e is of the same construction as the strap 47a except that its end segments 54a, 54b are sewn on the same side of the strap 47e and each end has the same construction as end segment 54 of the strap 47a to provide a triangular tab 60a at each end of the strap. Accordingly, the hooks 55 of the end segments 54a, 54b protrude to the same side of strap. The tabs 60a at each end enables the ends of the strap to be easily threaded through a respective one of the cradle arms 26a, 26b from inside out as when making the connection loop 57b of the first described embodiment, to make the hook and loop fastener connection loops 57e, 57f which correspond to the connection loops to the cradle arms of the other described embodiments.

In the embodiment of FIG. 14, a female snap fastener part 64, which is the same as that shown in FIGS. 12–13 with a base 66 and hooks (not shown in FIG. 14) for interconnecting with the loop material of the strap 47e, is used for establishing a fixed connection between the strap 47e and a male snap fastener part on the golf bag (not shown in FIG. 14) as in the strapping embodiment of FIGS. 10–11.

In strapping the golf bag into the cradle in the embodiment of FIG. 14, initially the connection loop 57e to the cradle arm 26a may be made from the inside out with an estimated length for the return end length 68b being approximated so that the total length of the intermediate length 68a and the end length 68c is sufficient to make the connection loop 57f to cradle arm 26b. In the case of the large size bag illustrated, the return end length 68a for the connection loop 57e will be essentially that necessary for making and securing a loop.

After the connection loop 57e is established, the strap 47e may be drawn taut around the front of the bag and over the male fastener part on the bag to determine the location on the strap for the female snap fastener part 64, the strap slackened and the hooks on the base 66 pressed into the loop material of the strap 47e at a location for engaging the male fastener part on the bag. The connection loop 57f through the cradle arm 26b may then be made with the return end length 68c being drawn to make the strap taut, as in the embodiment of FIG. 10. When the strapping is taut, the snap fastener is snapped over the male part on the bag and the connection loop completed by pressing the end segment 54f into the loop material on the intermediate length of the strap.

Figure 15:
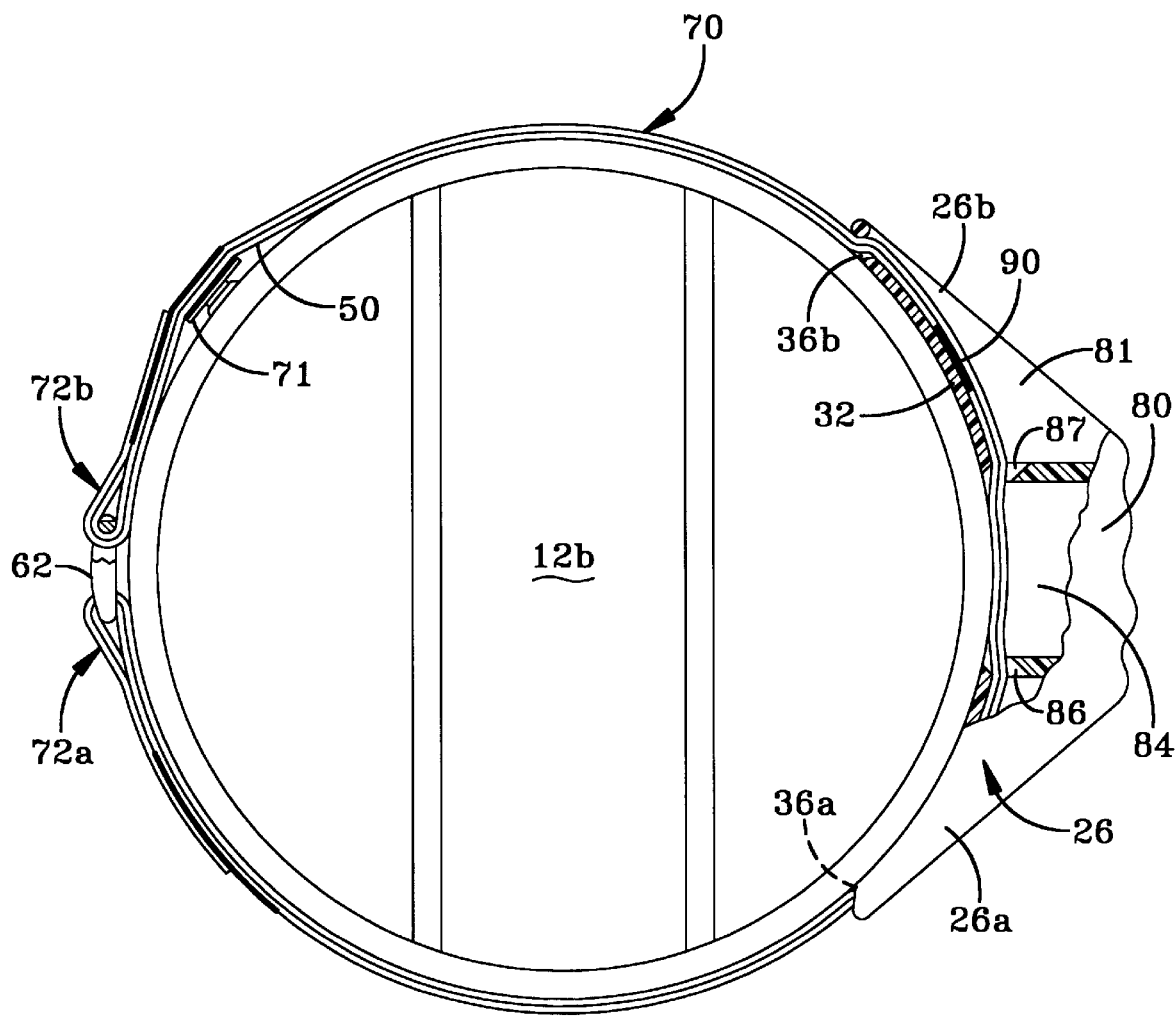
FIG. 15 is a fragmentary top plan view of a cart cradle corresponding to the cradle of FIG. 2 but with portions cutaway and showing another modified system of strapping for a golf bag without using a shoulder strap D-ring.

FIG. 15 illustrates a modification of the single strap embodiment of shown in FIG. 14 to hold the golf bag 12b in the upper cradle 26 of the cart 10. A strap 70 of the same structure as the strap 47e straps the bag in the cradle with the strap having a female snap fastener 71 corresponding in structure to the female snap fastener 64 of the embodiments of FIGS. 10 and 14, the hooks on the base of the female snap faster being interdigitated with the loop material 50 of the strap 70 to secure the female fastener part 71 in a position on the strap for engaging the conventional male hood snap fastener part on the bag as in earlier embodiments. However, instead of the single strap having connection loops to the cradle arms as in the embodiment of FIG. 14, the strap encircles the cradle and has connection loops 72a, 72b to a buckle 62 in the centrally located at the front of a golf bag 12b as in the embodiment of the FIG. 10.

While the single strap embodiment of FIG. 15 is in accordance with the various concepts of the present invention, it does not prevent rotation of the strap and bag relative to the cradle which is an object of the present invention. However, in accordance with the invention, hook means 90 for cooperating with the loop material of the strap 70 to form a hook and loop fastener is provided to connect the strap to the cart to hold the strap and the bag against rotation in the cradle.

Referring to FIG. 15, the upper cradle 26 of the cart 10 receives the golf bag 12b between its cradle arms 26a, 26b with the bag positioned against the circularly curved cradle wall 32 as in the previous embodiments. The cradle 26 has top and bottom flanges 80, 81 which respectively extend outwardly of the top and bottom of the wall, and a recess 84 is located centrally in the cradle wall 32 with strap slots 86, 87 at the opposite ends of the recess. Hook means 90 of a hook tape for a hook and loop fastener, is fixed to the outside of the wall 32 of the cradle 26, as by gluing, to interdigitate with the loop material on the sides of the strap 70 to keep the strap from rotating in the cradle.

The arms of the cradle 26 of FIG. 15, as previously described, have strap slots 36a, 36b at the ends of the cradle arms. The cart is initially strapped with the bag 12b out of the cart by threading one end of the strap 70 through one of the strap slots 36a, 36b, in the cradle arms 26a, 26b, for example, the strap slot 36a in the end of the cradle arm 26a, then from the slot 36a around the outside of the cradle wall 32 to and through the slot 86 in the wall 32 to the inside of the cradle and along the recess 84 to the slot 87, through the slot 87 and along the outside the cradle back wall 32 to and through the slot opening 36b in the cradle arm 26b. The strap 70 is preferably adjusted in the slots in the cradle arms 26a, 26b until the lengths of the strap outwardly of the cradle on each side thereof are approximately equal so as to place the buckle along the vertical centerline plan of the cradle. Then, after tightening the strap across the hook means 90, the portion of the strap across it is pressed against the hooks to secure the strap against rotation relative to the cradle wall. When this is done, the bag 12a may be put into place and the connection loop 72a made to the buckle 62 as in the embodiment of FIG. 10. Then, the location of the female snap fastener 71 on the strap length from the slot 36b in the cradle arm 26b may be determined, the female snap fastener fastened to the strap by pressing its hooks into the loop material of the strap, the strap pulled taut and the female fastener part snapped over the male fastener on the bag and the connection loop 72b made as in the embodiment of FIG. 10. Of course, the strap length from the cradle arm 26b may be connected to the buckle first, after making the female snap fastener connection for the fastener 71 as in the buckle embodiment of FIG. 10.

It will be understood that when a strap connection is made other than with loop connections to a ring on the golf bag to prevent rotation of the bag relative to the straps, e.g. when an independent buckle is used, the interconnection of the straps need not be at the center front of the bag as long the length of strapping from each cradle arm is sufficient to interconnect the straps or ends of the strap for the end lengths which are extend over the front of the bag in the cradle.

Figure 16:
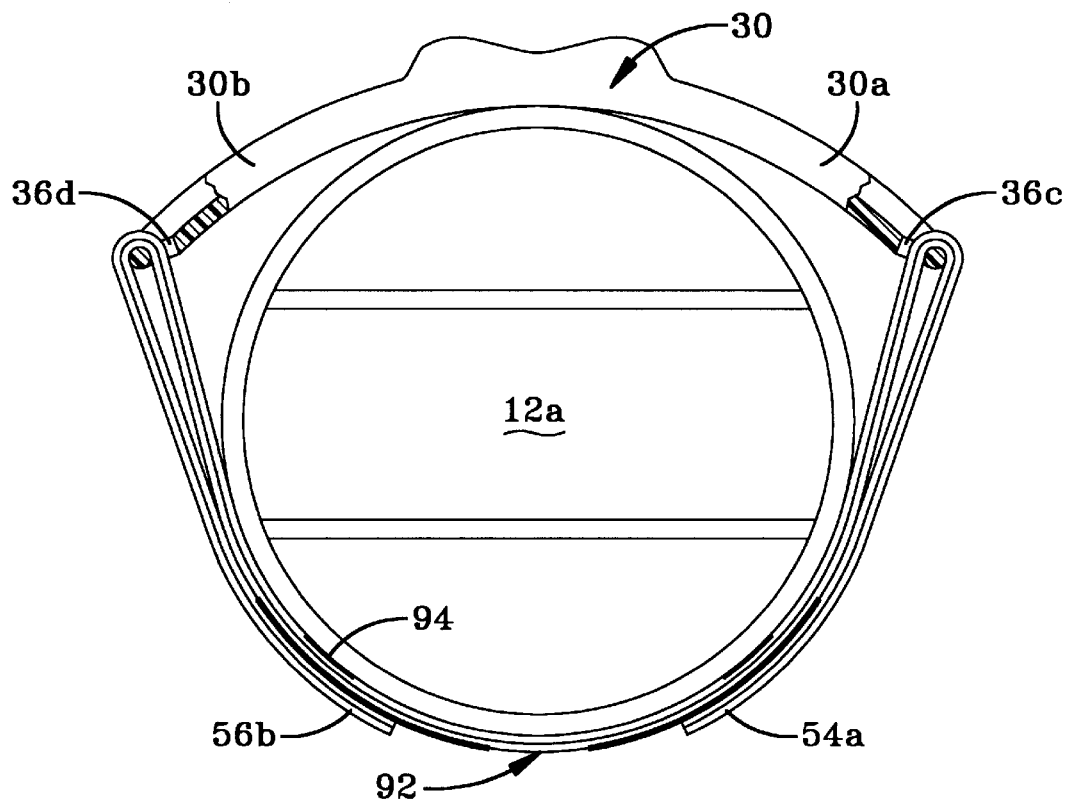
FIG. 16 is a fragmentary view of the cart of FIG. 1 showing a top plan view of the lower cradle on the golf bag cart of FIG. 1 with a smaller bag on the cart, as in FIG. 9, with portions of the cradle cutaway.
Figure 17:
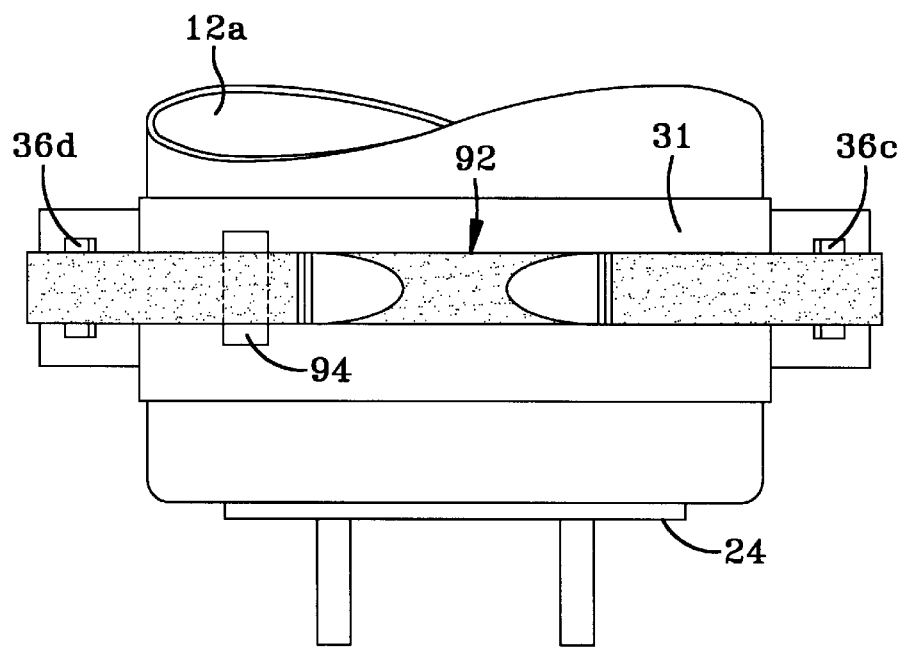
FIG. 17 is a front elevational view of the structure shown in FIG. 16.

Referring to FIGS. 16 and 17, which illustrate a strapping system for strapping the bag 12 of FIG. 1 in the lower cradle 30 of the cart of FIG. 1, the strapping system preferably utilizes a strap 92 of essentially the same structure as the strap of the single strap embodiment of FIG. 14, the strap having back to back loop tapes with loop material on opposite sides of the strap and extending for essentially the length of the sides and hook end segments with the hook end segments having their hooks for interfacing with the loop material of the strap protruding outwardly of the same side of the strap as in the strap embodiment of FIG. 14. The bottom collar of the bag 12 does not have a male snap fastener part and a hook tape may be adhered to the cradle as in the embodiment of FIG. 15, but preferably a hook tape 94 is attached to the lower collar of the bag 12, so as to engage the strap 92 when the bag is in the cradle and hold the bottom of the bag from rotating relative to the strapping. While the strap 92 is of the same construction as the strap 47e of FIG. 14, the strap 47e and the other straps described for use with upper cradle preferably have a width of essentially 1 inch while the strap 92 for the lower cradle preferably has a width of essentially ¾ inch so as to be better accommodated by the smaller strap slots 36c, 36d normally present in the arms of the lower cradle.

Figure 18:
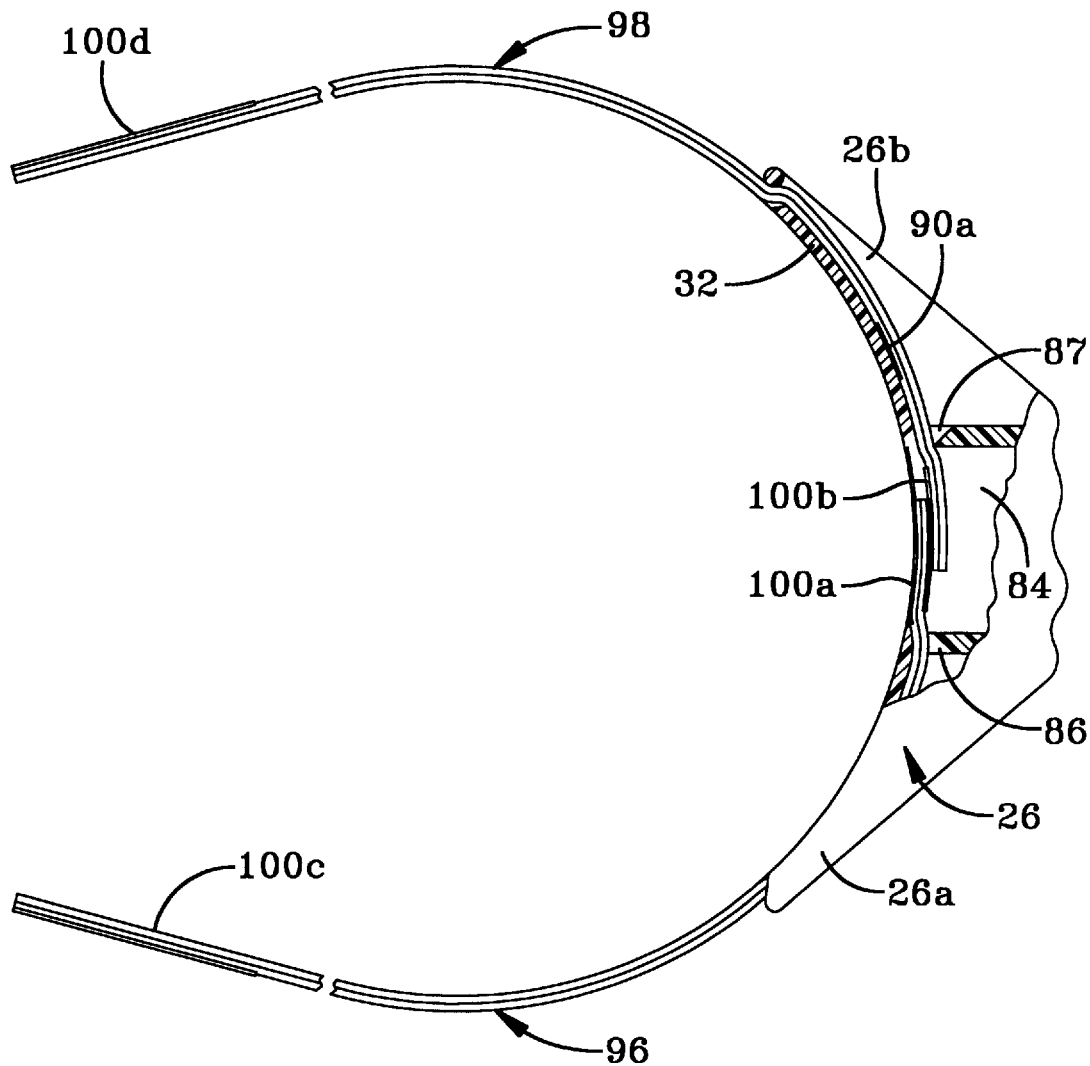
FIG. 18 is a cradle view corresponding to FIG. 15 but illustrating strapping having two straps interconnected to form a single strap with the interconnection functioning to hold the straps against movement around the cradle.
Figure 19:
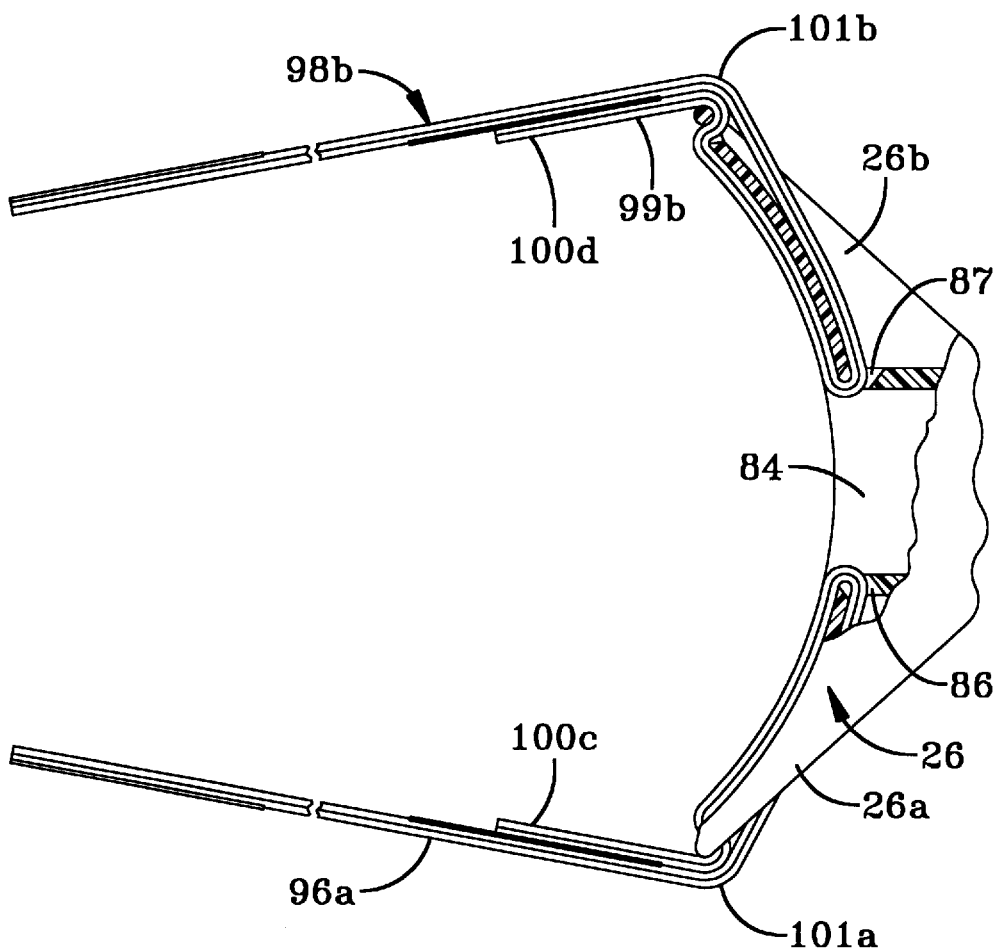
FIG. 19 is a cradle view corresponding to FIG. 15 but with a different cutaway portion and illustrating another strapping system.

FIGS. 18 and 19 show other modifications of the strapping system of the present invention.

In FIG. 18, the strapping for cradle 26 is illustrated as utilizing two straps 96, 98 essentially of the same structure as the strap 47a, as a single strap. The straps 96, 98 while essentially of the same structure as the strap 47a, has square end segments 100a and 100b, 100c, 100d at respective ends of the straps 96, 98 respectively, with each being comprised of hook tapes 53 corresponding in structure to the hook tape 53a of end segment 56 of the strap 47a (FIGS. 5–8) but sewn on the loop tapes with the hooks thereof protruding outwardly from the same side of the strap to provide end segments 100a, 100b, 100c, 100d.

As shown in FIG. 18, the end segments 100a, 100b of straps 96, 98 are threaded through respective slots in the cradle arms 26a, 26b of the cradle 26 with the hooks facing inwardly of the cradle, around the outside side of wall 32, and through the slots 86, 87, respectively, to overlap in the recess 84 with the strap 98 in back of strap 96 and with the hooks of the overlapping end segment 100b interdigitating with the loop material on the strap 96 to interconnect the straps into a single strap. The outer strap portions extending forwardly of the cradle arms can now be used to strap a bag to the cradle using an independent buckle as in the embodiment of FIG. 15, or to a D-ring of the bag as in FIG. 1. With this arrangement, the overlapping of the straps in the recess 84 may allow the straps to rotate in the cradle since the ends of the straps are spaced from the side walls of the cradle having the slots 86, 87. Accordingly, the straps are secured against rotation by a swatch 90a of hook tape which is glued to the cradle wall 32. During strapping, the hooks of the strap 98 is pressed against the hooks of the swatch 90a to secure the straps, and, in turn, the golf bag against rotation in the cradle, once the length of the outer portions of the strap extending from the cradle are established.

In FIG. 19, two straps 96a, 98b, of the same structure as in the embodiment of FIG. 18 are used. However, the straps 96a, 98b each have end segments 100c, 100d but these end segments are not interconnected in the central recess 84 in the cradle 26 as in the embodiment of FIG. 18. Instead the end segments 100a, 100b at the ends of each strap are threaded through the slots in the ends of the cradle arms 26a, 26b (only slot 36b in the cradle arm 26b being shown in FIG. 19) to form return lengths of connection loops 101a, 101b with the respective cradle arm. In strapping the cart, one end of the strap 96a is inserted through the slot 86 adjacent the end of the cradle arm 26a at the central part of the cradle, is drawn outwardly along the inside of the cradle arm 26a and threaded through the strap slot at its outer end to extend therefrom as part of the return length 99b of a connection loop 101a for connecting the strap to the cradle arm 26a. To complete the connection loop, the hooks of the end segment 100a of the strap are pressed into an intermediate length of the strap 96a to form a hook and loop re-closeable fastener for the connection loop. The strap 98b is connected to the cradle arm 26b in the same manner to anchor the strap 98b to the cradle arm 26b with a hook and loop connection loop 101b having a return length 100d.

From the foregoing description of various strapping systems utilizing the hoop and loop strapping, the flexibility of the novel strapping is readily apparent. While the preferred embodiment for strapping the golf bag to the upper cradle of a bag carrier, the use of the buckle arrangement, e.g. that shown in FIG. 10, is preferred if the strap is to be used to pick up the bag, particulary one containing clubs, and cart or other carrier to which the bag is strapped. Shoulder strap D-rings are such that the forces may overcome the shear strength of hook and loop connections to the D-ring and cause the strapping to the D-ring to loosen. However, as long as the hook and loop connection merely loosens, the simplicity of the strapping system enables the connection to be readily established, but under sufficient club weight the connection may open and cause a spilling of the clubs and bag as well as the cart or carrier in an uncontrolled manner.

Figure 20:
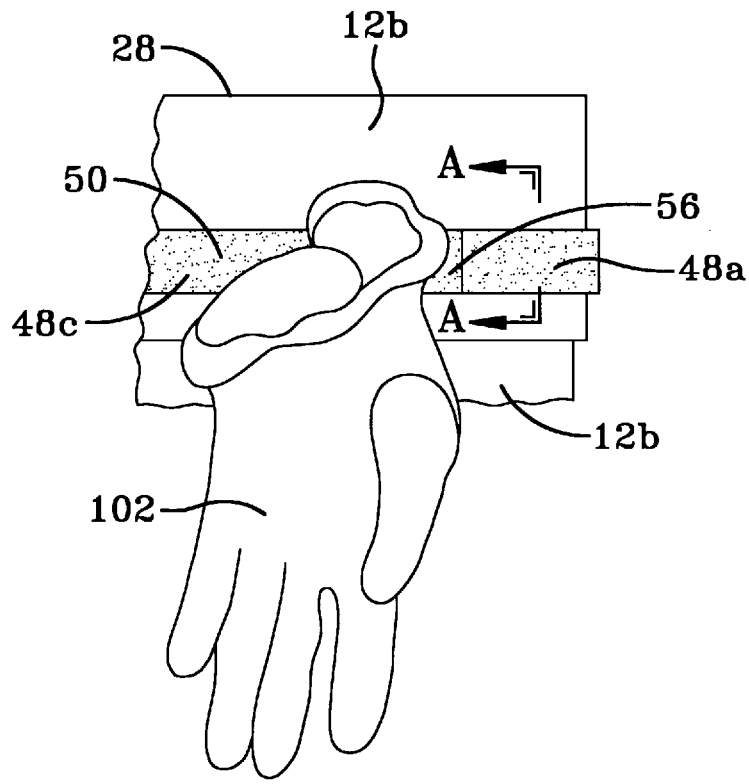
FIG. 20 is a fragmentary view of the golf bag and cradle strapping shown in FIG. 11 but having an accessory attached to the strapping.
Figure 21:
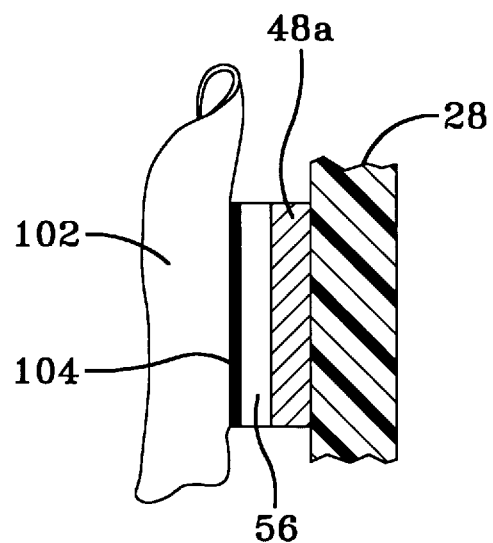
FIG. 21 is a cross sectional view taken along line A—A of FIG. 20.

One of the features of the present invention is that the use of napped looped tape with a woven base or strapping with the loop material extending the length of the straps to provide loop material to which accessories may be easily connected, removed and reconnected. The accessories may be any of the various items which a golfer may want to have with him on the course or to store temporarily on the cart or carrier stand. FIG. 20 is a fragmentary view of the right hand portion of FIG. 11 showing the golf bag 12b strapped to the upper cradle of the cart, but with a golf glove 102 attached to the loop material on the end segment 56 of the return end length 48c of strap 47c,. The golf glove has a hook tape thereon with hooks which interdigitate with the loop material of the end segment 56, which in turn, is hooked onto the loop material 50 of the intermediate length 48a (see FIG. 21).

Other golfing items, e.g. ball dispensers, score cards, etc. may be similarly attached. For a heavier item to be attached to the end segment 56 of strap 47c at the same location as the illustrated glove, a square swatch, for example, one about 3 times wider than the width of the strap, with a hook tape on the back side of the swatch and a loop tape on the front may be attached to the loop material of the strapping with the hooks of the hook tape on the back of the swatch, with or without the use of buckle-like slots in the swatch through which the strap is threaded to aid the hooks in supporting the swatch on the strap. Strap slots in such a swatch would have a length and width for closely receiving the strap. If the slots are used, the end segment 56 of the strap 47c would be released from its connection to the loop material 50 of the strap 47c and the end of the strap threaded through one of the slots from the hook side of the swatch to overlay the loop material between the slots and then threaded through the second slot back to the hook side of the swatch to provide a sliding connection between the swatch and the strap to position the swatch on the strap. When the swatch is in its desired position the return end length 47c is drawn taut and the hook and loop connection is remade between the end segment 56 and the intermediate length 48a of the strap and the hooks of the swatch are then pressed into the loop material of the end segment to complete the connection of the swatch to the end segment 56 of strap 47c. The strap slots in the swatch would preferably be parallel slots in a centered arrangement on the swatch with each spaced preferably about one third the width of the swatch from a respective one of the vertical sides of the swatch.

For increasing the resistance of the squared end segments 56 to peeling off the loop material in which the hooks of the end segment are embedded, particularly when an accessory mounted to the end segment with a hook and loop fastener connection is to be put on and taken off the end segment, the end segment is stitched to the loop tapes by a box stitch which is offset from the corresponding end of the strap 47c by about ¼" as illustrated in FIGS. 5.

Referring to FIG. 5, the end segment 56 of the strap 47a, corresponding to the strap 47c of FIG. 11, is sewn with the box stitch 59 having its box stitch cross stitch 59a adjacent the outer terminating end of the strap end length 48c, but offset inwardly of the terminating end a small distance, e.g. ¼ inch, to increase the resistance to the hooks to peeling out of a hook and loop re-closeable connection made with the same strap or another strap. Also see the end segment 56 in FIG. 4, which illustrates the freedom and flexibility of the hook tape end segment 56 from the loop tapes for that terminating portion of the hook tape outwardly of the cross stitch for the end segment. This technique for offsetting a box stitch to increase peeling, in and of itself, has been previously known and used in the prior art of manufacturing hook and loop re-closeable fasteners for other applications. It should be noted when the cross stitch 59a is offset from the end of the strap, the center stitching for the two loop tapes will release from the cross stitch 59a to the end of the strap.

Figure 22:
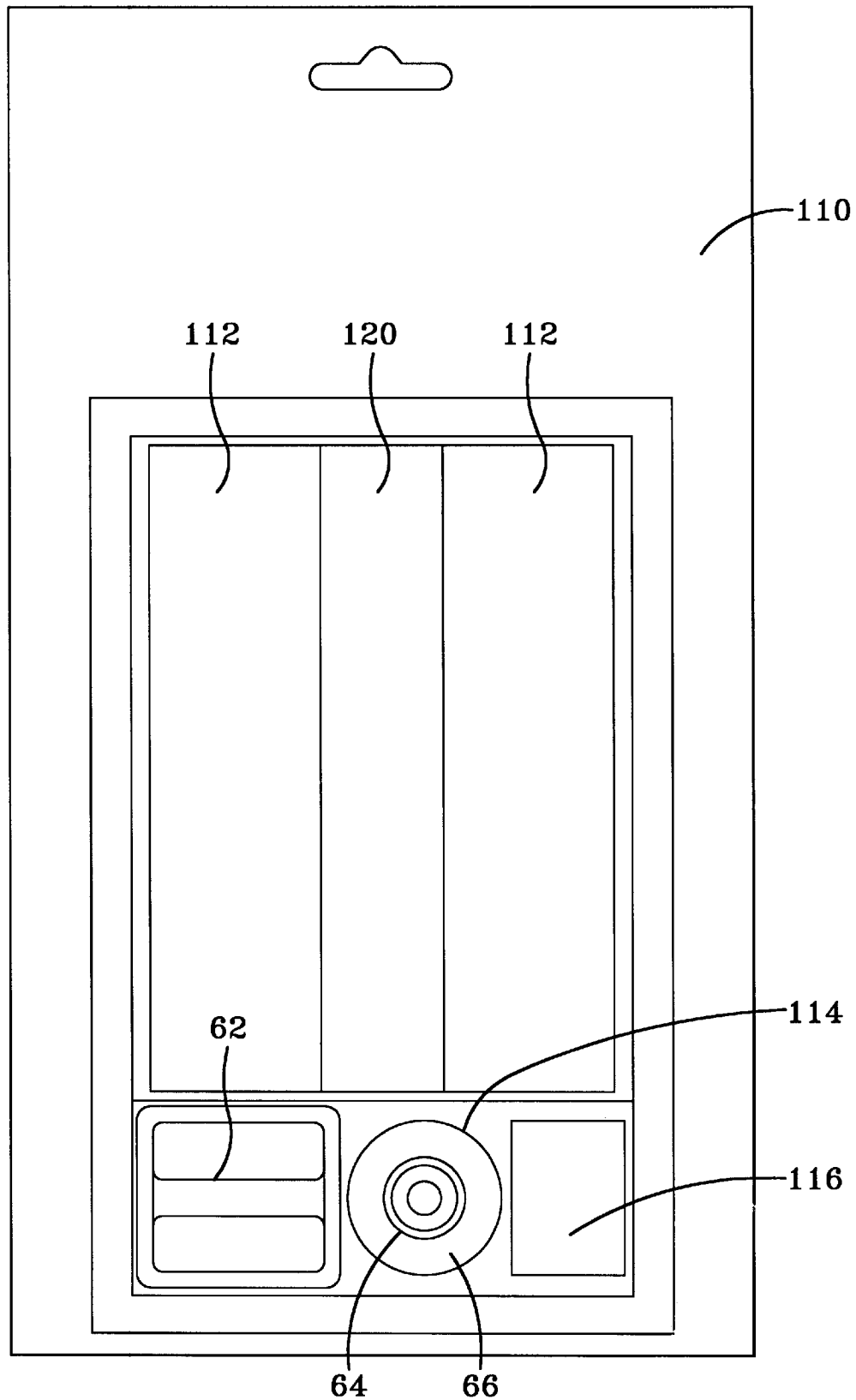
FIG. 22 is a plan view of the transparent front side of a blister package containing a universal kit having straps and fastening connectors for use in accordance with the invention.

One aspect of the present invention provides a universal strapping kit for use with the various golf bags and carts. The kit is illustrated in FIG. 22 in which a blister package having a transparent front 110 contains (1) two folded hook and loop re-closeable fastener straps 112, preferably of the construction of FIGS. 5–8, for use in strapping a golf bag to the upper cradle of a cart using the D-ring of a golf bag, (2) a buckle 62, for use as described in various embodiments of the present invention for strapping a golf bag to a cradle without using a D-ring, or to one without a D-ring, (3) a hook fastener button 114 of the construction of FIGS. 12 and 13 having a base 66 with hooks thereon and a female snap fastener part 64, as shown in FIGS. 12 and 13, (4) preferably a plurality of swatches 116 of hook tape material for use on a bag or the cradle as previously described, and, preferably, (5) a strap of hook and loop material 120 corresponding to the lower strap 92 described for the lower cradle of the cart 10.

It will be appreciated that a kit with only two hook and loop fastener tapes, for example 21", as is the preferred length for the strapping systems shown using two straps, enables most bags to be strapped onto most cradles if the bag has a D-ring. To accommodate bags without D-rings, the provision of the buckle 64 and the hook and loop swatches 116 to make a connection between the bag and the strapping or the cart and the strapping enables essentially all the bags, whether having a D-ring or not, to strapped to the upper cradle of a cart or carrier. However, the preference is to also include the female snap fastener part since it adds more flexibility to the particular strapping system which may be used. With the inclusion of the lower strap 120 the kit is a complete strapping for both cradles of a golf bag carrier. With the lower strap, a swatch is needed to connect the strapping to the bag. So, in the preferred universal strapping kit, all five of the components listed are included, although a lesser two belt kit for the upper cradle with either a buckle or the swatches of hook and loop tape and/or the female snap fastener part will enable the strapping of a golf bag in the upper cradle of most all bag carriers, the most important cradle in preventing bag rotation.

It will be understood that the novel double faced woven strap described provides a double faced strap of loop material with a woven base or backing which makes the strap suitable for use as a golf cart strap and as well as being usable in other applications which cannot use the knitted double faced strap which has no backing and which is otherwise unsuitable for many applications.

What I claim is:

1. In a golf bag carrier for individually transporting golf bags having sizes within a predetermined range of golf bag sizes including golf bags having a shoulder-strap-ring, said carrier having a cradling structure for receiving the golf bag with a front portion of the golf bag extending outwardly of the cradling structure and strapping for releasably holding the golf bag in the cradling structure, the cradling structure comprising spaced strap support structures for receiving the golf bag therebetween with the front portion extending outwardly of the strap supporting structures, said support structures comprising slots for said strapping, said strapping to be drawn tautly across said front portion of the bag and having a respective outer strap portion extending outwardly from each of said strap supporting structures to provide an adjustable effective strap length to be drawn tautly across the front portion of the bag to hold the bag in the cradling structure, said strapping comprising: first securing means on said strapping for making a releasable connection of said outer strap portions to said cradling structure to secure said outer strap portions from moving outwardly from the strap support structures of the cradling structure on tautening of said outer strap portions, and second securing means on the strapping for releasably connecting said strapping directly to the golf bag received for transport in the cradling structure to positively hold the golf bag against rotation within the cradling structure relative to the strapping and the cradling structure.

2. In a golf bag carrier for individually transporting golf bags having sizes within a predetermined range of golf bag sizes including golf bags having a shoulder-strap-ring, the carrier having a cradling structure and strapping as defined in claim 1 wherein said strapping has a respective outer end outwardly of each said strap support structure from which said outer strap portions extend, and each of said strap portions having means at each of said outer ends for selectively making a releasable and re-closeable adjustable terminating end loop in which said outer end is doubled back along the length of and connected to the respective outer strap portion for adjusting the length of the loop and said effective length of the outer strap portion to render the outer strap portion taut across the golf bag being strapped in the cradling structure.

3. In a golf bag carrier for individually transporting golf bags having sizes within a predetermined range of golf bag sizes including golf bags having a shoulder-strap-ring, said carrier having cradling structure for receiving the golf bag to be transported and strapping as defined in claim 2 in which said strapping comprises a single strap, said second securing means comprising an element of said single strap for making the connection thereof to the golf bag to be transported and said first securing means comprising end lengths of said strap with each length being selectively doubled back along said strap portions to form a said releasable and re-closeable terminating end loop to provide end loops for securing the strap to the strap support structures of the cradling structure.

4. In a golf bag carrier for individually transporting golf bags having sizes within a predetermined range of golf bag sizes including golf bags having a shoulder-strap-ring, said carrier having cradling structure for receiving the golf bag to be transported and strapping as defined in claim 3 in which said single strap has opposite side faces and is composed of re-closeable fastener loop tapes having woven bases in back to back engagement and loop material integrally woven with each base and extending for essentially the full length of the strap on both respective side faces thereof and an end segment of hook material at each of its ends, said end segments having hooks which protrude outwardly from the strap whereby each end length of the strap may be selectively doubled back along the strap and connected to a side of the strap to provide said releasable and re-closeable loops of said first securing means.

5. In a golf bag carrier for individually transporting golf bags having sizes within a predetermined range of golf bag sizes including golf bags having a shoulder-strap-ring, the carrier having cradling structure for receiving the golf bag to be transported and strapping as defined in claim 2 in which said second securing means selectively comprises said end loops of said outer strap portions for connecting said strapping to the shoulder-strap-ring of the golf bag to be transported.

6. In a golf bag carrier for individually transporting golf bags having sizes within a predetermined range of golf bag sizes including golf bags having a shoulder-strap-ring, as defined in claim 2, in which said strapping has opposing strap sides with lengthwise edges, and said second securing means comprises fastening means on said strapping for selectively connecting the golf bag received in the cradle to one of the sides of the strapping.

7. In a golf bag carrier for carrier for individually transporting golf bags having sizes within a predetermined range of golf bag sizes including golf bags having a shoulder-strap-ring, cradling structure and strapping as defined in claim 1 in which said strapping comprises at least one strap providing said outer strap portions, each said strap having strap end portions at its opposite ends and each said strap being composed of a continuous loop tape for a re-closeable hook and loop fastener, said loop tape extending and having loop material extending for essentially the full length of the strap on both sides of the strap and each said strap having hook end segments on said strap end portions of the strap, said end segments each being of hook material and providing hooks which protrude outwardly from a side of the strap adjacent the respective end of the strap whereby either end of a strap may be selectively doubled back as an adjustable continuously variable return end length of the strap to extend along the strap and be releaseably connected to the loop material of said strap for providing an adjustable continuously variable length end loop for selectively making the said connection of one or both of said first and second securing means.

8. In a golf bag carrier for individually transporting golf bags having sizes within a predetermined range of golf bag sizes including golf bags having a shoulder-strap-ring, the carrier having cradling structure for receiving the golf bag to be transported and strapping as defined in claim 7 in which said outer strap portions each comprise a respective strap end portion forwardly of the cradling structure with each of said respective strap end portions having a respective said adjustable continuously variable length end loop, with the return length of each of said adjustable variable length end loops being continuously adjustable in loop length to adjust the effective length of the strap end portion and the tautness of said strapping.

9. In a golf bag carrier for individually transporting golf bags having sizes within a predetermined range of golf bag sizes including golf bags having a shoulder-strap-ring, the carrier having cradling structure for receiving the golf bag to be transported and strapping as defined in claim 8 in which said adjustable continuously variable length end loops are connectable to the shoulder-strap-ring on the golf bag received in the cradling structure and comprise said second securing means.

10. In a golf bag carrier for individually transporting golf bags having sizes within a predetermined range of golf bag sizes including golf bags having a shoulder-strap-ring, the carrier having cradling structure and strapping as defined in claim 7 in which a ring element independent of the golf bag interconnects said outer strap portions, each said outer strap portions comprising a respective strap end portion forwardly of the bag received in the cradling structure with each of said respective strap end portions having a respective said adjustable continuously variable length end loop for cooperating with said ring element to interconnect said outer strap portions of said strapping for varying the effective length of said strapping to render said strapping taut, and said second securing means comprises a fastening element on said strapping for cooperating with an element affixed to the golf bag.

11. In a golf bag carrier for individually transporting golf bags having sizes within a predetermined range of golf bag sizes including golf bags having a shoulder-strap-ring, the carrier having cradling structure and strapping as defined in claim 10 in which said second securing means comprises a base on said fastening element, said base having hooks for interdigitating with the loop material of said strapping to secure the fastening element to said strapping.

12. In a golf bag carrier for individually transporting golf bags having sizes within a predetermined range of golf bag sizes including golf bags having a shoulder-strap-ring, the carrier having cradling structure and strapping as defined in claim 10 and in which said loop material of said strap cooperates with hook material on the golf bag to provide said second securing means.

13. In a golf bag carrier for individually transporting golf bags having sizes within a predetermined range of golf bag sizes including golf bags having a shoulder-strap-ring, cradling structure for receiving the golf bag to be transported and strapping as defined in claim 8 wherein said strapping consists of two straps supported on said cradling structure, said two straps each providing one of said outer strap portions and each strap comprising a strap end portion at each end of the strap for forming an adjustable continuously variable length end loop at each of its opposite ends for adjusting the tautness and effective length of the outer strap portion of the strap, said first securing means comprising one of said adjustable continuously variable length end loops at a first end of each strap for connecting the respective strap to said cradling structure.

14. In a golf bag carrier for individually transporting golf bags having sizes within a predetermined range of golf bag sizes including golf bags having a shoulder-strap-ring, cradling structure for receiving the golf bag to be transported and strapping as defined in claim 13 in which said second securing means comprises said adjustable continuously variable length end loops at second ends of said straps for connecting said strapping to the shoulder-strap-ring on a golf bag received in the cradling structure.

15. In a golf bag carrier for individually transporting golf bags having sizes within a predetermined range of golf bag sizes including golf bags having a shoulder-strap-ring, the carrier having cradling structure and strapping as defined in claim 13 in which said strapping comprises a ring independent of the golf bag, and said second securing means comprises said loop material on said strapping to the golf bag.

16. In a golf bag carrier for individually transporting golf bags having sizes within a predetermined range of golf bag sizes including golf bags having a shoulder-strap-ring, the carrier having cradling structure and strapping as defined in claim 15 in which said second securing means comprises a fastening element and a fastening element base, said base having hooks for interdigitating with the loop material of said strapping to secure the fastening element to said strapping.

17. In a golf bag carrier for individually transporting golf bags having sizes within a predetermined range of golf bag sizes including golf bags having a shoulder-strap-ring, the carrier having cradling structure and strapping as defined in claim 15 in which said second securing means comprises said loop material on one of said strap portions for cooperating with hook material on the golf bag to be secured.

18. In a golf bag carrier for individually transporting golf bags having sizes within a predetermined range of golf bag sizes including golf bags having a shoulder-strap-ring, cradling structure for receiving the golf bag to be transported a,d strapping as defined in claim 1 in which said strapping comprises a strap which comprises at least one of said outer strap portions with each outer strap portion having a terminating end portion at a respective one of the opposite ends of the strap, said strap comprising loop tape for a hook and loop recloseable fastener and having loop material extending essentially the full length of said strap with said loop material constituting the sides of said strap, said strap having end segments of hook tape on said loop material adjacent the said opposite ends of the strap, said end segments having hooks protruding therefrom for interdigitating with said loop material at any location for essentially the full length of the strap upon doubling back of said end segments along the strap to selectively form releasable and re-closeable continuously adjustable variable length end loops at the ends of said strap for adjusting the said effective strap length.

19. In a golf bag carrier for individually transporting golf bags having sizes within a predetermined range of golf bag sizes including golf bags having a shoulder-strap-ring, the carrier having cradling structure and strapping as defined in claim 1, said strapping comprising at least one strap providing said outer strap portions, each strap of said strapping having a width for use in strap slots of the golf bag cradling structure and a length for accommodating various golf bag sizes and consisting of continous back to back woven loop tapes comprising loop material for making hook and loop re-closeable connections, said loop tapes of each strap having woven back to back bases and integrally woven loop material extending to the respective side of the strap outwardly of its respective base to provide loop material extending the length of the respective strap side, the flexibility of said loop tapes being such that each end of the strap may be selectively doubled back along the strap to lay along the length of the strap, and each end of each strap having a respective hook segment on the loop material of the strap adjacent each end of the strap, said hook segments each having hooks extending outward of the strap from the hook segment for selectively making a hook and loop recloseable connection with the loop material on the strap to provide an adjustable return end length of an end loop at the end of the strap with the end loop having loop material on both sides of the return end length, said hooks of each said hook segment being selectively interdigitatable with the loop material of the strap at any location along essentially the full length of the strap to afford a continuously adjustable return length for said end loop to adjust and secure the length of the return end length and the effective strap length of the strap so as to accommodate a range of bag sizes, at least one of said first and second securing means selectively comprising an end loop for making the respective connection of the securing means.

20. In a golf bag carrier for individually transporting golf bags of different sizes within a predetermined range, including golf bags having shoulder strap D-rings, said carrier having cradling structure for receiving the golf bag to be transported and strapping as defined in claim 19 in which said back to back loop tapes of each said strap are joined by single, straight line stitching extending essentially the full length of the strap and centered between the lengthwise edges thereof.

21. In a golf bag carrier for individually transporting golf bags having sizes within a predetermined range of golf bag sizes including golf bags having a shoulder-strap-ring, as defined in claim 1, in which said strapping has opposing sides with lengthwise edges along the sides, and said second securing means comprises fastening means on said strapping for selectively connecting the golf bag received in the cradle to one of said sides of the strapping.

22. A golf bag carrier strap for strapping a golf bag to a golf bag carrier having a golf bag cradling structure with strap slots therein and the strap having a length accommodating a range of golf bag sizes which require different effective strap lengths for releasably strapping different size bags in the cradling structure, said strap having a width for use in the slots of the cradle structure and an intermediate effective length to be drawn tautly across a golf bag received in the cradling structure of the golf bag carrier and being of loop tape having loop material extending essentially the full length of the strap for effecting hook and loop recloseable connections and comprising hook segments at each end of the strap, each of said hook segments comprising hooks for interdigitating with said loop material at any lengthwise location along the the loop material of the strap to provide a continuous adjustment for the effective strap length of the strap whereby a range of bag sizes may be strapped in the cradling structure, said strap consisting of back to back continuous woven loop tapes having woven bases back to back against each other and woven loop material extending from the respective woven bases to the opposite sides of said strap with said loop material extending essentially the full length of the strap, the flexibility of said tapes being such that the outer ends of the strap may each be selectively doubled back along the strap to provide a return end length of an end loop for the strap with the return end length lying adjacent and along the length of the strap with the end loop having loop material on both sides of the return end length, said hook segments being mounted on the strap at the respective ends thereof with the hooks on each hook segment being selectively interdigitatable with the loop material of the strap at any location along the length of the loop material to fasten the end of the strap to the loop material and afford a continuously variable adjustment for the length of the respective return length and of the respective end loop to adjust said effective length of the strap.

23. A golf bag carrier strap as defined in claim 22 in which said back to back woven loop tapes are joined by single straight line stitching extending essentially the full length of said strap and centered between the length edges thereof.

24. A method for securing a golf bag on a golf bag carrier having a golf bag cradle for receiving golf bags within a range of a range of golf bag sizes with the golf bag received extending forwardly of the cradle and being strapped in the cradle by strapping supported on the cradle with the strapping having a length to accommodate the range of golf bag sizes and provide outer strap portions extending from opposite sides of the cradle of the golf bag carrier for tautening across the front portion of the golf bag in the cradle, the steps of: supporting the strapping on the cradle with outer strap portions extending outwardly from the opposite sides of said cradle for tautening across the golf bag in the cradle to provide an effective length of the strapping across the bag, releasably connecting said strapping directly to the golf bag in the cradle to positively hold the golf bag in the cradle against rotation in the cradle around the longitudinal centerline of the golf bag, and adjusting and fixing the effective length of the strapping to render and maintain the effective length taut across the golf bag.

25. A method as defined in claim 24 in which the steps include connecting first and second end portions of the outer strap portions to the opposite sides of the cradle to hold the strapping against moving outwardly of the cradle, and the tautening of the strapping comprises doubling back outer terminating ends of said outer strap portions to make continuously adjustable end loops with the loops having return end lengths for lying along the respective outer strap portion and looping the return end lengths through an element having a fixed location on the golf bag and adjusting and fixing the return end lengths of the loops of the outer strap portions to adjust and interconnect the effective lengths of the outer strap portions and render and maintain the strapping taut across the bag and to secure the strapping to the golf bag to be transported.

26. A method as defined in claim 24 in which the steps include connecting the strapping to the opposite sides of the cradle to hold the strapping against moving outwardly of the cradle and doubling back outer terminating ends of said outer strap portions to make continuously adjustable end loops for said outer strap portions with the loops having a respective return end length lying along the respective outer strap portion, passing the return end lengths of the loops around a holding element to adjust the return end lengths of the loops to adjust and interconnect the effective lengths of the outer strap portions and to tauten the effective lengths of the strapping across the golf bag to be transported, and fixing the outer ends of the return lengths to the outer strap portions to maintain the strapping taut across the golf bag.

27. A method as defined in claim 26 which comprises the steps of supporting the strapping on the cradle by passing terminal end portions of the strapping through cradle slots on the opposite sides of the cradle to form continuously adjustable end loops having adjustable return end lengths lying along the sides of corresponding ones of said outer strap portions and adjusting the return end lengths of the loops to adjust the length of the outer strap portions to render the strapping taut, and directly connecting one side of the strapping and the golf bag to hold the golf bag against rotation in the cradle.

28. A method for securing a golf bag in the cradle of a golf carrier as defined in claim 24 in which the effective length of the strapping is made taut and fixed to maintain the tautness by doubling terminating ends for said outer strap portions back along the outer strap portions to form return end lengths of adjustable end loops for each outer strap portion and moving the terminating ends of the return end lengths along the outer strap portions to adjust the effective length of the strapping and draw the effective length taut across the across the front portion of the golf bag and fixing the terminating ends of the outer strap portions to the outer strap portions to fix and maintain the tautness of the effective length of the strapping across the golf bag.

29. A method as defined in claim 24 in which the step of releaseably connecting the strapping to the golf bag comprises fixing the golf bag to the effective length of the outer strap portions.

* * * * *